(12) United States Patent
Morita

(10) Patent No.: US 7,733,160 B2
(45) Date of Patent: Jun. 8, 2010

(54) POWER SUPPLY CIRCUIT, DISPLAY DRIVER, ELECTRO-OPTICAL DEVICE, AND ELECTRONIC INSTRUMENT

(75) Inventor: Akira Morita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 12/010,503

(22) Filed: Jan. 25, 2008

(65) Prior Publication Data

US 2009/0079495 A1 Mar. 26, 2009

(30) Foreign Application Priority Data

Jan. 29, 2007 (JP) ............................. 2007-017908
Jan. 29, 2007 (JP) ............................. 2007-017909
Dec. 19, 2007 (JP) ............................. 2007-327194
Dec. 19, 2007 (JP) ............................. 2007-327195

(51) Int. Cl.
G05F 1/10 (2006.01)
G05F 3/02 (2006.01)

(52) U.S. Cl. ........................................ 327/536; 327/537

(58) Field of Classification Search ................. 327/536, 327/537
See application file for complete search history.

(56) References Cited

U.S. PATENT DOCUMENTS 5,898,335 A * 4/1999 Miyamoto et al. .......... 327/535
7,560,915 B2 * 7/2009 Ito et al. ..................... 323/282
2003/0067289 A1   4/2003 Morita
2005/0253825 A1 * 11/2005 Kawamura et al. .......... 345/204
2007/0297203 A1 * 12/2007 Itoh ............................. 363/60
2008/0007980 A1 * 1/2008 Fujiwara ....................... 363/59
2008/0036529 A1 * 2/2008 Ishiyama ..................... 327/536
2009/0027022 A1 * 1/2009 Oyama et al. ................ 323/282
2009/0079495 A1 * 3/2009 Morita ........................ 327/538
2009/0167418 A1 * 7/2009 Raghavan .................... 327/536
2009/0184753 A1 * 7/2009 Kawashima et al. ......... 327/536

FOREIGN PATENT DOCUMENTS

JP    A 9-312095    12/1997
JP    A 2003-102165    4/2003

* cited by examiner

Primary Examiner—Lincoln Donovan
Assistant Examiner—Adam D Houston
(74) Attorney, Agent, or Firm—Oliff & Berridge PLC

(57) ABSTRACT

A power supply circuit includes a voltage booster circuit that generates a boosted voltage by boosting a second voltage with respect to a first voltage, and a limiter circuit that limits a potential of the boosted voltage. The limiter circuit discharges a charge to or charges a charge from a power supply line so that the boosted voltage becomes a given target voltage, the second voltage being supplied to the power supply line. The voltage booster circuit changes a boost capability corresponding to an output load of the power supply circuit.

18 Claims, 20 Drawing Sheets

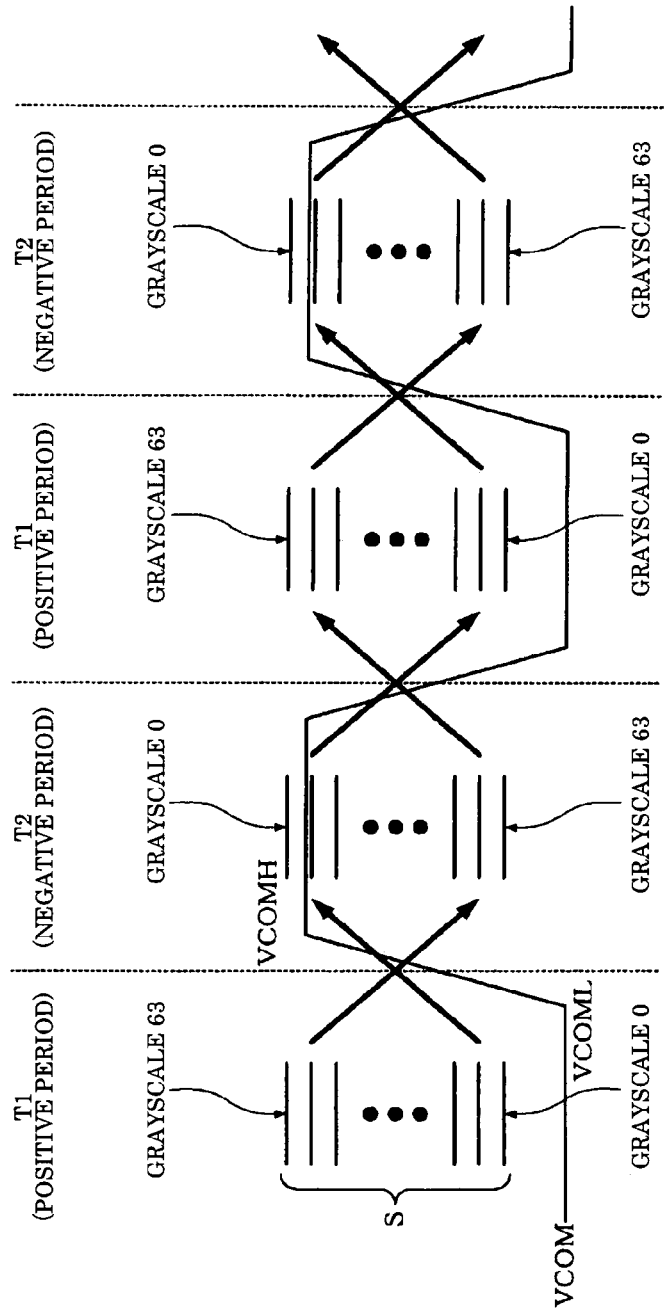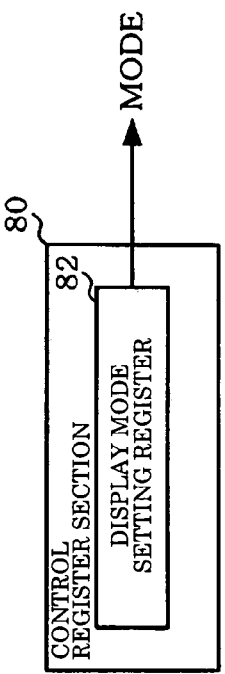
FIG. 8
FIG. 9

| MODE | REG1en | ENB1 | ENB2 | LMTen |
|---|---|---|---|---|
| NORMAL DISPLAY MODE | disable | enable or disable | enable | enable |
| PARTIAL DISPLAY MODE | enable | enable | disable | disable |

FIG. 21
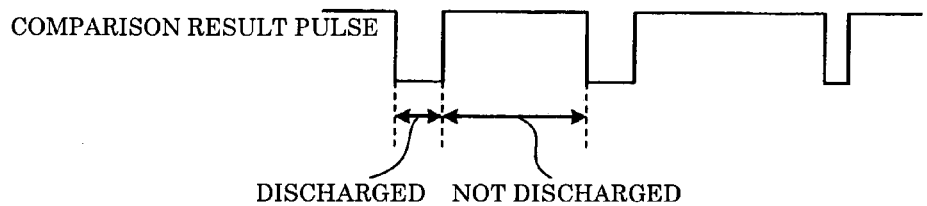
FIG. 22
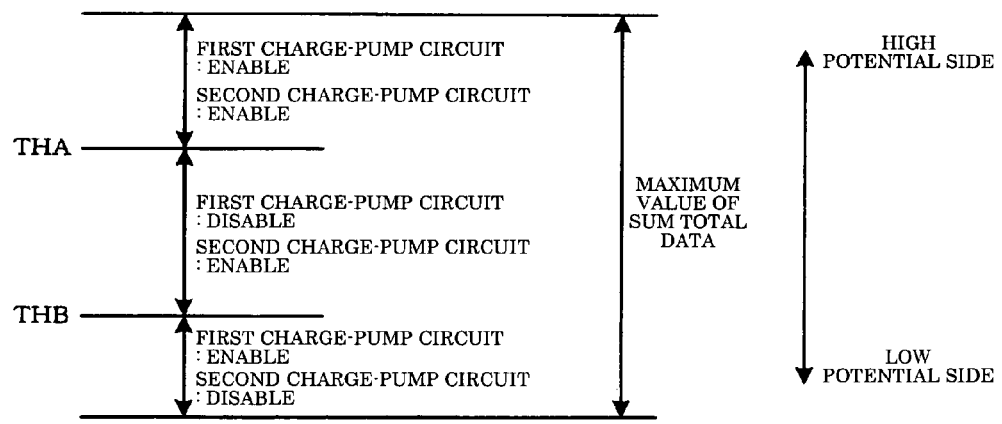
FIG. 23

POWER SUPPLY CIRCUIT, DISPLAY DRIVER, ELECTRO-OPTICAL DEVICE, AND ELECTRONIC INSTRUMENT

Japanese Patent Application No. 2007-17908 filed on Jan. 29, 2007, Japanese Patent Application No. 2007-17909 filed on Jan. 29, 2007, Japanese Patent Application No. 2007-327194 filed on Dec. 19, 2007, and Japanese Patent Application No. 2007-327195 filed on Dec. 19, 2007, are hereby incorporated by reference in their entirety.

BACKGROUND OF THE INVENTION

The present invention relates to a power supply circuit, a display driver, an electro-optical device, an electronic instrument, and the like.

A reduction in power consumption is desired for portable electronic instruments. A liquid crystal display device is generally used as a display device incorporated in such electronic instruments. A plurality of power supply voltages such as a high voltage and a negative voltage are required to drive a liquid crystal display device. In this case, it is desirable from the viewpoint of cost that a liquid crystal driver device which drives a liquid crystal display device include a power supply circuit which generates a plurality of power supply voltages.

Such a power supply circuit includes a voltage booster circuit. As the voltage booster circuit, a charge-pump circuit which generates a boosted voltage by a charge-pump operation is generally used (see JP-A-9-312095, for example). A charge-pump circuit connects one end of a capacitor which stores a charge to various voltages using switching elements (e.g., metal oxide semiconductor (MOS) transistors), thereby boosting the voltage corresponding to the charge stored in the capacitor. Power consumption can be reduced using such a charge-pump circuit.

It is desirable to reduce the output load of the voltage booster circuit as much as possible from the viewpoint of the power efficiency of the voltage booster circuit. Therefore, the output of the voltage booster circuit is directly connected to a circuit to which the output voltage from the voltage booster circuit is supplied, as disclosed in JP-A-9-312095, for example.

A regulator is used when regulating the output potential of the voltage booster circuit. In this case, it is desirable to operate the regulator at a low operating voltage in order to reduce power consumption. Therefore, a voltage regulated using the regulator is input to the voltage booster circuit instead of regulating the voltage boosted by the voltage booster circuit using the regulator.

When regulating a potential using the regulator, the maximum value of the output voltage from the regulator is lower than a high-potential-side power supply voltage of the regulator by at least a threshold voltage $\Delta Vthp$ of a transistor, for example. This also applies to the minimum value of the output voltage from the regulator. Specifically, the minimum value of the output voltage from the regulator is higher than a low-potential-side power supply voltage of the regulator by at least a threshold voltage $\Delta Vthn$ of a transistor. Specifically, the range of the output voltage from the regulator is narrow as compared with the voltage between the low-potential-side power supply voltage and the high-potential-side power supply voltage of the regulator. When the output voltage from the regulator is boosted by a factor of S (S is a number larger than one), only a voltage which is lower in potential by $S \times \Delta Vthn$ than a voltage obtained by boosting the high-potential-side power supply voltage of the regulator can be obtained. This means that the power supply voltage range of a circuit to which a voltage obtained by boosting the output voltage from the regulator is supplied decreases. As a result, a power supply margin decreases.

When the voltage of the voltage booster circuit which boosts the voltage regulated by the regulator exceeds the target voltage, a charge is discharged to a system ground power supply in order to decrease the voltage which exceeds the target voltage. For example, when the absolute maximum rating of an integrated circuit is 6 V and a voltage of 3.3 V is boosted by a factor of two, a charge is discharged so that the potential of the boosted voltage decreases by 0.6 V (=3.3×2-6). Therefore, the power consumption of the power supply circuit can be reduced by reducing the amount of charging/discharging for regulating the voltage which exceeds the target voltage.

The power efficiency of the power supply circuit changes corresponding to the output load of the power supply circuit. This means that a boost operation is performed using unnecessary power depending on the output load. Therefore, it is desirable that the boost capability be changed corresponding to the output load of the power supply circuit, and that the boost capability be changed so that a stable voltage can be supplied to the output load.

Moreover, the output load of the power supply circuit which supplies a power supply voltage to a liquid crystal display device may differ depending on a display image or a display mode of the liquid crystal display device. The boost efficiency of the power supply circuit may decrease when the output load is low.

SUMMARY

According to one aspect of the invention, there is provided a power supply circuit that outputs a boosted voltage, the power supply circuit comprising:

a voltage booster circuit that generates a boosted voltage by boosting a second voltage with respect to a first voltage; and a limiter circuit that limits a potential of the boosted voltage, the limiter circuit discharging a charge to or charging a charge from a power supply line so that the boosted voltage becomes a given target voltage, the second voltage being supplied to the power supply line.

According to another aspect of the invention, there is provided a display driver that drives an electro-optical device, the display driver comprising:

the above power supply circuit; and a driver section that drives the electro-optical device, a drive voltage of the driver section being generated based on the boosted voltage.

According to another aspect of the invention, there is provided an electro-optical device comprising:

a plurality of gate lines;

a plurality of source lines;

a gate driver that scans the plurality of gate lines;

a source driver that drives the plurality of source lines; and the above power supply circuit, at least one of a scan voltage of the gate driver and a drive voltage of the source driver being generated based on the boosted voltage.

According to another aspect of the invention, there is provided an electronic instrument comprising the above power supply circuit.

BRIEF DESCRIPTION OF THE SEVERAL VIEWS OF THE DRAWING

FIG. 8 is a view illustrative of polarity inversion drive according to one embodiment of the invention.

FIG. 9 is a view illustrative of a control register section included in a display driver according to one embodiment of the invention.

FIG. 21 is a view illustrative of the operation of a power supply circuit control section of a power supply circuit according to the second configuration example.

FIG. 22 is a view illustrative of a comparison result pulse output from a comparator.

FIG. 23 is a view illustrative of an example of the operation of a determination logic section shown in FIG. 20.

DETAILED DESCRIPTION OF THE EMBODIMENT

Figure 1:
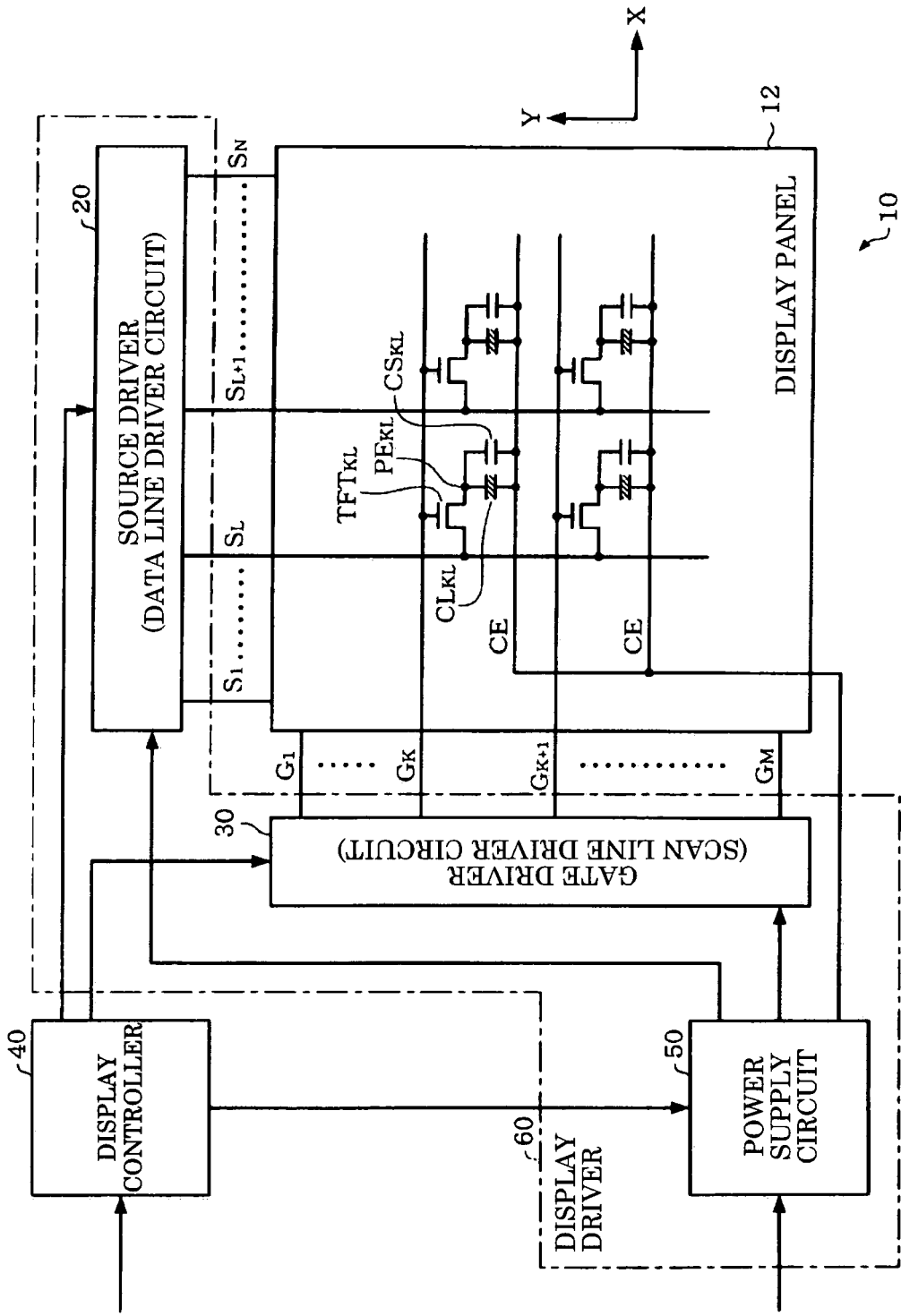
FIG. 1 is a view showing an example of a block diagram of a liquid crystal display device according to one embodiment of the invention.

Several aspects of the invention may provide a power supply circuit which can supply a boosted voltage at low power consumption without decreasing boost efficiency, a display driver, an electro-optical device, and an electronic instrument.

Several aspects of the invention may provide a power supply circuit which can ensure a sufficient power supply margin, a display driver, an electro-optical device, and an electronic instrument.

Further aspects of the invention may provide a power supply circuit which can supply a boosted voltage at low power consumption without decreasing boost capability even if the output load increases, a display driver, an electro-optical device, and an electronic instrument.

According to one embodiment of the invention, there is provided a power supply circuit that outputs a boosted voltage, the power supply circuit comprising:

a voltage booster circuit that generates a boosted voltage by boosting a second voltage with respect to a first voltage; and a limiter circuit that limits a potential of the boosted voltage, the limiter circuit discharging a charge to or charging a charge from a power supply line so that the boosted voltage becomes a given target voltage, the second voltage being supplied to the power supply line.

According to this embodiment, since a charge is discharged to the power supply line to which the boost target power supply voltage is supplied when the boosted voltage has exceeded the target voltage, power consumption can be reduced to a large extent as compared with the case of discharging a charge to the power supply line to which a system ground power supply voltage is supplied.

In the power supply circuit according to this embodiment, the power supply circuit may further include a regulator that regulates a potential of a given input voltage, a drive voltage of an electro-optical device may be generated based on the boosted voltage, the power supply circuit may output a voltage obtained by limiting the potential of the boosted voltage using the limiter circuit as the boosted voltage when the electro-optical device is driven in a high-load display mode, the power supply circuit may output a voltage obtained by boosting an output voltage from the regulator using the voltage booster circuit as the boosted voltage without limiting the potential of the boosted voltage using the limiter circuit when the electro-optical device is driven in a low-load display mode.

In the power supply circuit according to this embodiment, the power supply circuit may further include a display mode setting register, the power supply circuit may output a voltage obtained by limiting the potential of the boosted voltage using the limiter circuit as the boosted voltage when the high-load display mode is designated by control data set in the display mode setting register, the power supply circuit may output a voltage obtained by boosting the output voltage from the regulator using the voltage booster circuit as the boosted voltage when the low-load display mode is designated by the control data set in the display mode setting register.

According to the above embodiment, the boosted voltage can be generated with a high boost capability when the output load of the power supply circuit is high, and can be generated with a low boost capability when the output load of the power supply circuit is low, whereby the boosted voltage can be stably supplied without decreasing the boost efficiency to a large extent.

In the power supply circuit according to this embodiment, the voltage booster circuit may include:

a first charge-pump circuit that generates the boosted voltage by boosting the output voltage from the regulator with respect to the first voltage by a charge-pump operation using a first flying capacitor; and a second charge-pump circuit that generates the boosted voltage by boosting the second voltage with respect to the first voltage by a charge-pump operation using a second flying capacitor, the second flying capacitor having a capacitance larger than a capacitance of the first flying capacitors, the power supply circuit may output the boosted voltage generated by the first charge-pump circuit and the second charge-pump circuit or the boosted voltage generated by the second charge-pump circuit when the electro-optical device is driven in the high-load display mode, the power supply circuit may output the boosted voltage generated by the first charge-pump circuit when the electro-optical device is driven in the low-load display mode.

According to this embodiment, the boost capability of the power supply circuit can be changed by a simple configuration and control.

In the power supply circuit according to this embodiment, the power supply circuit may perform control that changes a boost capability of the voltage booster circuit corresponding to an output load of the power supply circuit when the electro-optical device is driven in the high-load display mode, the power supply circuit may omit the control that changes the boost capability of the voltage booster circuit corresponding to the output load of the power supply circuit when the electro-optical device is driven in the low-load display mode.

According to this embodiment, since the boost capability can be changed corresponding to a display image by which the output load of the power supply circuit changes in the high-load display mode, a decrease in boost efficiency can be reliably suppressed.

In the power supply circuit according to this embodiment, when the high-load display mode is designated, the power supply circuit may decrease the boost capability when the power supply circuit has determined that the boost capability is high with respect to the output load of the power supply circuit, and may increase the boost capability when the power supply circuit has determined that the boost capability is low with respect to the output load of the power supply circuit.

According to this embodiment, since the boost capability can be maintained at an appropriate level corresponding to the output load, a situation in which the boost efficiency decreases with respect to the output load can be prevented while stabilizing the voltage obtained based on the boost capability.

In the power supply circuit according to this embodiment, when the high-load display mode is designated, the voltage booster circuit may change the boost capability based on the output load of the power supply circuit and limiter operation information, the limiter operation information indicating whether or not the limiter circuit has limited the potential of the boosted voltage.

In the power supply circuit according to this embodiment, when the high-load display mode is designated, the voltage booster circuit may change the boost capability based on a comparison result between a threshold value and the output load of the power supply circuit, the threshold value being updated based on the limiter operation information.

In the power supply circuit according to this embodiment, the threshold value may be updated based on a comparison result between a given threshold voltage and the boosted voltage.

In the power supply circuit according to this embodiment, the power supply circuit may further include:

a comparator that compares the given threshold voltage with the boosted voltage; and a counter that counts a pulse width or a number of pulses of an output result of the comparator, the threshold value may be updated based on a count value of the counter.

According to the above embodiment, since the boost capability can be changed based on the operation information relating to the limiter circuit, a power supply circuit can be provided which can perform a low-power-consumption operation for various types of output load with an optimum boost capability.

In the power supply circuit according to this embodiment, a drive voltage corresponding to grayscale data supplied to a source line among a plurality of source lines of the electro-optical device may be generated based on the boosted voltage, the output load may be evaluated based on a sum total of grayscale data of the plurality of source lines corresponding to one scan line.

According to this embodiment, the output load can be evaluated by a simple configuration.

In the power supply circuit according to this embodiment, the voltage booster circuit may change a boost capability corresponding to an output load of the power supply circuit.

In the power supply circuit according to this embodiment, since the limiter circuit discharges a charge to or charges a charge from the power supply line to which the second voltage (boost target power supply) is supplied so that the boosted voltage becomes a given target voltage, a charge can be recycled so that the power consumption of the power supply circuit can be reduced.

Moreover, since the boost capability of the voltage booster circuit is changed corresponding to the output load of the power supply circuit, a situation in which the boost efficiency decreases with respect to the output load can be prevented while preventing a decrease in boost capability when the output load is high.

In the power supply circuit according to this embodiment, the power supply circuit may decrease the boost capability when the power supply circuit has determined that the boost capability is high with respect to the output load of the power supply circuit, the power supply circuit may increase the boost capability when the power supply circuit has determined that the boost capability is low with respect to the output load of the power supply circuit.

According to this embodiment, since the boost capability can be maintained at an appropriate level corresponding to the output load, a situation in which the boost efficiency decreases with respect to the output load can be prevented while stabilizing the voltage obtained based on the boost capability.

In the power supply circuit according to this embodiment, the voltage booster circuit may change the boost capability based on the output load and limiter operation information, the limiter operation information indicating whether or not the limiter circuit has limited the potential of the boosted voltage.

In the power supply circuit according to this embodiment, the voltage booster circuit may change the boost capability based on a comparison result between a threshold value and the output load, the threshold value being updated based on the limiter operation information.

In the power supply circuit according to this embodiment, the threshold value may be updated based on a comparison result between a given threshold voltage and the boosted voltage.

In the power supply circuit according to this embodiment, the power supply circuit may further include:

a comparator that compares the given threshold voltage with the boosted voltage; and a counter that counts a pulse width or a number of pulses of an output result of the comparator, the threshold value may be updated based on a count value of the counter.

According to the above embodiment, since the boost capability can be changed based on the operation information relating to the limiter circuit, a power supply circuit can be provided which can perform a low-power-consumption operation for various types of output load with an optimum boost capability.

In the power supply circuit according to this embodiment, a drive voltage corresponding to grayscale data supplied to a source line among a plurality of source lines of the electro-optical device may be generated based on the boosted voltage, the output load may be evaluated based on a sum total of grayscale data of the plurality of source lines corresponding to one scan line.

According to this embodiment, the output load can be evaluated by a simple configuration.

In the power supply circuit according to this embodiment, the voltage booster circuit may include:

a first charge-pump circuit that generates the boosted voltage by boosting the output voltage from the regulator with respect to the first voltage by a charge-pump operation using a first flying capacitor; and a second charge-pump circuit that generates the boosted voltage by boosting the second voltage with respect to the first voltage by a charge-pump operation using a second flying capacitor, the second flying capacitor having a capacitance larger than a capacitance of the first flying capacitors, the power supply circuit may output the boosted voltage generated by the first charge-pump circuit, the boosted voltage generated by the second charge-pump circuit, or the boosted voltage generated by the first charge-pump circuit and the second charge-pump circuit after the boost capability of the voltage booster circuit has been changed.

According to this embodiment, the boost capability of the voltage booster circuit can be changed by a simple configuration.

According to another embodiment of the invention, there is provided a display driver that drives an electro-optical device, the display driver comprising:

one of the above power supply circuits; and a driver section that drives the electro-optical device, a drive voltage of the driver section being generated based on the boosted voltage.

In the above display driver, the driver section may drive a plurality of source lines of the electro-optical device based on a drive voltage that is generated using the boosted voltage and corresponds to grayscale data.

According to the above embodiment, a display driver can be provided to which a power supply circuit which can supply the boosted voltage at low power consumption without decreasing the boost efficiency, even when the output load increases, is applied.

According to another embodiment of the invention, there is provided an electro-optical device comprising:

a plurality of gate lines;

a plurality of source lines;

a gate driver that scans the plurality of gate lines;

a source driver that drives the plurality of source lines; and one of the above power supply circuit, at least one of a scan voltage of the gate driver and a drive voltage of the source driver being generated based on the boosted voltage.

Another embodiment of the invention relates to an electro-optical device comprising:

a plurality of gate lines;

a plurality of source lines;

a gate driver that scans the plurality of gate lines;

and the above display driver that drives the plurality of source lines.

According to the above embodiment, an electro-optical device can be provided to which a power supply circuit which can supply the boosted voltage at low power consumption without decreasing the boost efficiency, even when the output load increases, is applied.

According to another embodiment of the invention, there is provided an electronic instrument comprising one of the above power supply circuits.

Another embodiment of the invention relates to an electronic instrument comprising the above display driver.

A further embodiment of the invention relates to an electronic instrument comprising the above electro-optical device.

According to the above embodiment, an electronic instrument can be provided to which a power supply circuit which can supply the boosted voltage at low power consumption without decreasing the boost efficiency, even when the output load increases, is applied.

Embodiments of the invention are described in detail below with reference to the drawings. Note that the embodiments described below do not in any way limit the scope of the invention laid out in the claims. Note that all elements of the embodiments described below should not necessarily be taken as essential requirements for the invention.

1. Liquid Crystal Display Device

FIG. 1 shows an example of a block diagram of a liquid crystal display device according to one embodiment of the invention.

A liquid crystal display device 10 (liquid crystal device; electro-optical device in a broad sense) includes a display panel 12 (liquid crystal panel or liquid crystal display (LCD)

panel in a narrow sense; electro-optical panel in a broad sense), a source driver 20 (data line driver circuit in a broad sense), a gate driver 30 (scan line driver circuit in a broad sense), a display controller 40, and a power supply circuit 50. The liquid crystal display device 10 need not necessarily include all of these circuit blocks. The liquid crystal display device 10 may have a configuration in which some of these circuit blocks are omitted. The term "electro-optical device" may include a device using a light-emitting element such as an organic electroluminescence (EL) element or an inorganic EL element.

The display panel 12 (electro-optical device) includes a plurality of gate lines (scan lines in a broad sense), a plurality of source lines (data lines in a broad sense), and a plurality of pixel electrodes specified by the gate lines and the source lines. In this case, an active matrix type liquid crystal display device may be formed by connecting a thin film transistor (TFT; switching element in a broad sense) to the source line and connecting the pixel electrode to the TFT.

Specifically, the display panel 12 is an amorphous silicon liquid crystal panel in which an amorphous silicon thin film is formed on an active matrix substrate (e.g. glass substrate). A plurality of gate lines $G_1$ to $G_M$ (M is a natural number equal to or larger than two), arranged in a direction Y in FIG. 1 and extending in a direction X, and a plurality of source lines $S_1$ to $S_N$ (N is a natural number equal to or larger than two), arranged in the direction X and extending in the direction Y, are disposed on the active matrix substrate. A thin film transistor $TFT_{KL}$ (switching element in a broad sense) is provided at a position corresponding to the intersection of the gate line $G_K$ ($1 \leq K \leq M$, K is a natural number) and the source line $S_L$ ($1 \leq L \leq N$, L is a natural number).

A gate electrode of the thin film transistor $TFT_{KL}$ is connected to the gate line $G_K$, a source electrode of the thin film transistor $TFT_{KL}$ is connected to the source line $S_L$, and a drain electrode of the thin film transistor $TFT_{KL}$ is connected to a pixel electrode $PE_{KL}$. A liquid crystal capacitor $CL_{KL}$ (liquid crystal element) (i.e., element capacitor) and an auxiliary capacitor $CS_{KL}$ are formed between the pixel electrode $PE_{KL}$ and a common electrode CE opposite to the pixel electrode $PE_{KL}$ through a liquid crystal (electro-optical material in a broad sense). The liquid crystal is sealed between the active matrix substrate provided with the thin film transistor $TFT_{KL}$, the pixel electrode $PE_{KL}$, and the like and a common substrate provided with the common electrode CE. The transmissivity of the pixel changes depending on the voltage applied between the pixel electrode $PE_{KL}$ and the common electrode CE. The term "element capacitor" may include a liquid crystal capacitor formed in a liquid crystal element and a capacitor formed in an EL element such as an inorganic EL element.

The voltage level of a common electrode voltage VCOM (high-potential-side voltage VCOMH and low-potential-side voltage VCOML) applied to the common electrode CE is generated by a common electrode voltage generation circuit included in the power supply circuit 50. The common electrode CE is formed over the entire common substrate, for example.

The source driver 20 drives the source lines $S_1$ to $S_N$ of the display panel 12 based on grayscale data. The gate driver 30 scans (sequentially drives) the gate lines $G_1$ to $G_M$ of the display panel 12.

The display controller 40 controls the source driver 20, the gate driver 30, and the power supply circuit 50 according to information set by a host (not shown) such as a central processing unit (CPU). Specifically, the display controller 40 sets the operation mode of the source driver 20 and the gate driver 30 or supplies the vertical synchronization signal and the horizontal synchronization signal generated therein to the source driver 20 and the gate driver 30, and controls the power supply circuit 50 relating to the polarity inversion timing of the voltage level of the common electrode voltage VCOM applied to the common electrode CE, for example.

The power supply circuit 50 generates various voltage levels (grayscale voltages) necessary for driving the display panel 12 and the voltage level of the common electrode voltage VCOM applied to the common electrode CE by raising a system power supply voltage supplied from the outside, for example. The power supply circuit 50 according to this embodiment generates a boosted voltage obtained by boosting a system power supply voltage VDD. The power supply circuit 50 is configured so that the boost capability when generating the boosted voltage can be changed. For example, the power supply circuit 50 according to this embodiment is configured so that the power supply circuit 50 receives an evaluation value for evaluating the output load of the power supply circuit 50 from the source driver 20, and the boost capability can be changed based on the evaluation value. The term "boost capability" used herein refers to capability of changing the output voltage corresponding to a change in output load current.

When the source driver 20 and the gate driver 30 form a driver section which drives the display panel 12, the drive voltage of the driver section can be generated based on the voltage boosted by the power supply circuit 50.

In the liquid crystal display device 10 having such a configuration, the source driver 20, the gate driver 30, and the power supply circuit 50 cooperate to drive the display panel 12 based on grayscale data supplied from the outside under control of the display controller 40.

In FIG. 1, the liquid crystal display device 10 includes the display controller 40. Note that the display controller 40 may be provided outside the liquid crystal display device 10. Alternatively, the liquid crystal display device 10 may include the host together with the display controller 40. Some or all of the source driver 20, the gate driver 30, the display controller 40, and the power supply circuit 42 may be formed on the display panel 12.

In FIG. 1, the source driver 20, the gate driver 30, and the power supply circuit 50 may be integrated to form a display driver 60 as a semiconductor device (integrated circuit (IC)).

Figure 2:
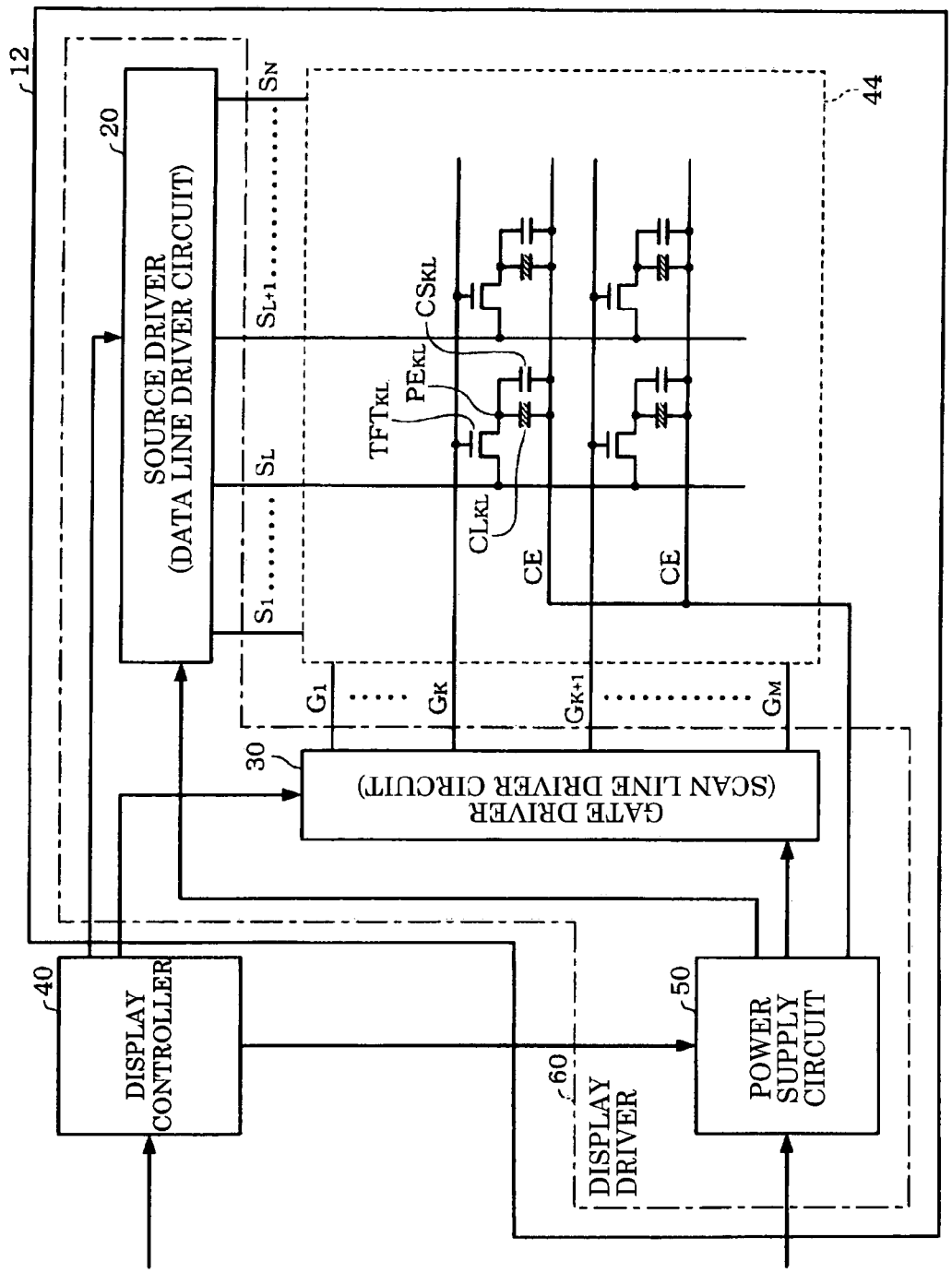
FIG. 2 is a block diagram showing another configuration example of a liquid crystal display device according to one embodiment of the invention.

FIG. 2 is a block diagram showing another configuration example of the liquid crystal display device according to this embodiment.

In FIG. 2, the display driver 60 which includes the source driver 20, the gate driver 30, and the power supply circuit 50 is formed on the display panel 12 (panel substrate). Specifically, the display panel 12 may be configured to include a plurality of gate lines, a plurality of source lines, a plurality of pixels (pixel electrodes), each of which is connected to the corresponding gate line and the corresponding source line, a source driver which drives the source lines, and a gate driver which scans the gate lines. The pixels are formed in a pixel formation region 44 of the display panel 12. Each pixel may include a TFT, of which the source is connected to the source line and the gate is connected to the gate line, and a pixel electrode connected to the drain of the TFT.

In FIG. 2, at least one of the gate driver 30 and the power supply circuit 50 may not be formed on the display panel 12.

In FIG. 1 or 2, the display driver 60 may include the display controller 40. In FIG. 1 or 2, the display driver 60 may be a semiconductor device formed by integrating either the source driver 20 or the gate driver 30 and the power supply circuit 50.

1.1 Gate Driver

Figure 3:
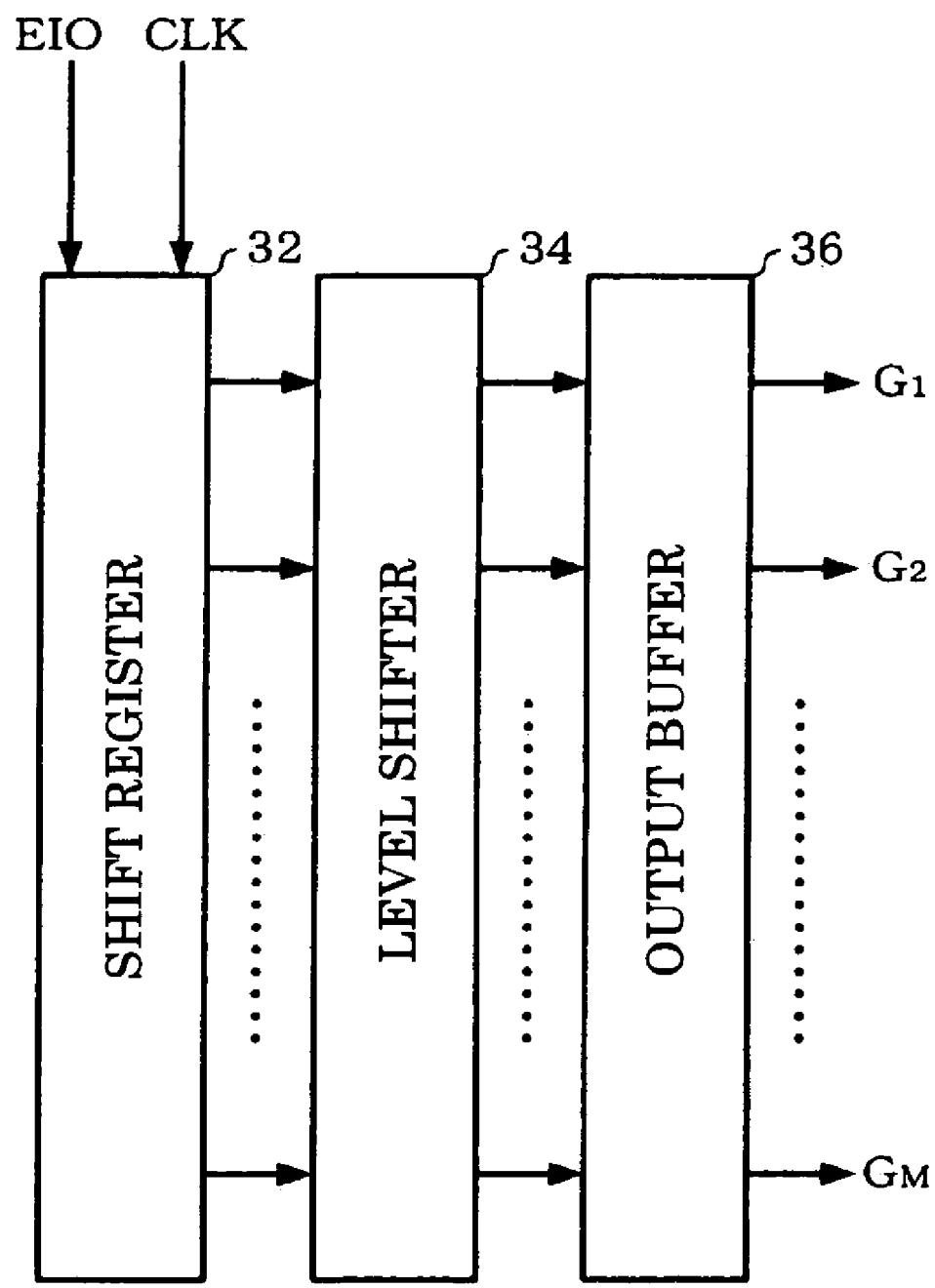
FIG. 3 is a block diagram showing a configuration example of a gate driver shown in FIG. 1 or 2.

FIG. 3 shows a configuration example of the gate driver 30 shown in FIG. 1 or 2.

The gate driver 30 includes a shift register 32, a level shifter 34, and an output buffer 36.

The shift register 32 includes a plurality of flip-flops provided corresponding to the gate lines and sequentially connected. The shift register 32 holds an enable input-output signal EIO in the flip-flop in synchronization with a clock signal CLK, and then sequentially shifts the enable input-output signal EIO to the adjacent flip-flops in synchronization with the clock signal CLK. The enable input-output signal EIO input to the shift register 32 is a vertical synchronization signal supplied from the display controller 40.

The level shifter 34 shifts the voltage level from the shift register 32 to the voltage level corresponding to the liquid crystal element of the display panel 12 and the transistor capability of the TFT. Since a high voltage level is required as the above voltage level, a high voltage process differing from that for other logic circuit sections is used for the level shifter 54.

The output buffer 36 buffers the scan voltage shifted by the level shifter 34, and outputs the scan voltage to the gate line to drive the gate line.

1.2 Source Driver

Figure 4:
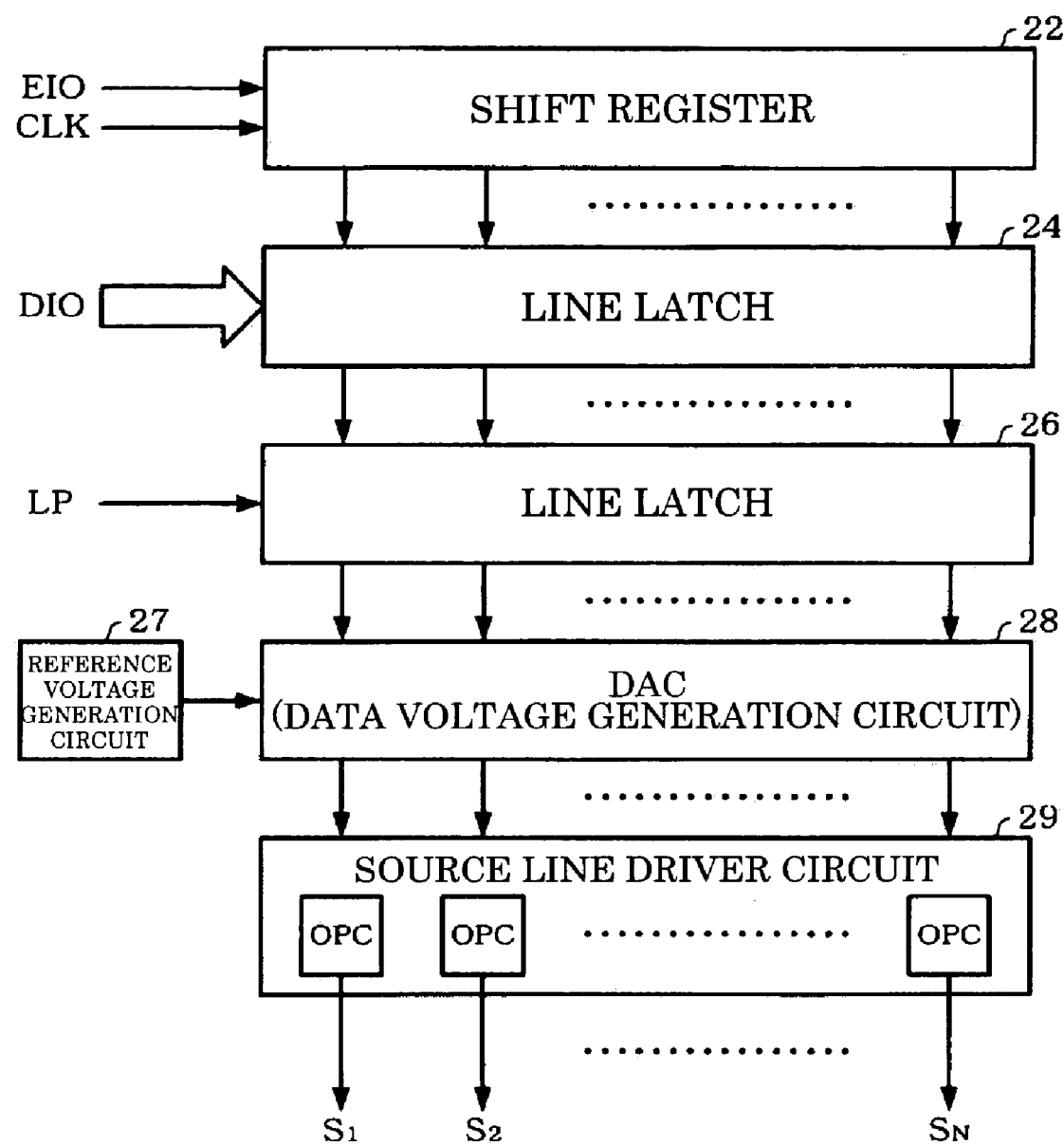
FIG. 4 is a block diagram showing a configuration example of a source driver shown in FIG. 1 or 2.

FIG. 4 is a block diagram showing a configuration example of the source driver 20 shown in FIG. 1 or 2.

The source driver 20 includes a shift register 22, line latches 24 and 26, a digital-to-analog converter (DAC) 28 (data voltage generation circuit in a broad sense), and a source line driver circuit 29.

The shift register 22 includes a plurality of flip-flops provided corresponding to the source lines and sequentially connected. The shift register 22 holds the enable input-output signal EIO in synchronization with the clock signal CLK, and then sequentially shifts the enable input-output signal EIO to the adjacent flip-flops in synchronization with the clock signal CLK.

Grayscale data (DIO) is input to the line latch 24 from the display controller 40 in units of 18 bits (6 bits (grayscale data)×3 (RGB)), for example. The line latch 24 latches the grayscale data (DIO) in synchronization with the enable input-output signal EIO which is sequentially shifted by the flip-flops of the shift register 22.

The line latch 26 latches the grayscale data corresponding to one horizontal scan latched by the line latch 24 in synchronization with a horizontal synchronization signal LP supplied from the display controller 40.

The reference voltage generation circuit 27 generates 64 (=$2^6$) different reference voltages. The 64 different reference voltages generated by the reference voltage generation circuit 27 are supplied to the DAC 28.

The DAC (data voltage generation circuit) 28 generates an analog data voltage supplied to each source line. Specifically, the DAC 28 selects one of the reference voltages from the reference voltage generation circuit 27 based on the digital grayscale data from the line latch 26, and outputs an analog data voltage corresponding to the digital grayscale data.

The source line driver circuit 29 buffers the data voltage from the DAC 28, and outputs the data voltage to the source line to drive the source line. Specifically, the source line driver circuit 29 includes voltage-follower-connected operational amplifiers OPC (impedance conversion circuits in a broad sense) provided corresponding to the source lines. Each operational amplifier circuit OPC subjects the data voltage from the DAC 28 to impedance conversion, and outputs the resulting data voltage to the corresponding source line.

FIG. 4 employs a configuration in which the digital grayscale data is subjected to digital-analog conversion and is output to the source line through the source line driver circuit 29. Note that a configuration may also be employed in which an analog image signal is sampled/held and output to the source line through the source line driver circuit 29.

Figure 5:
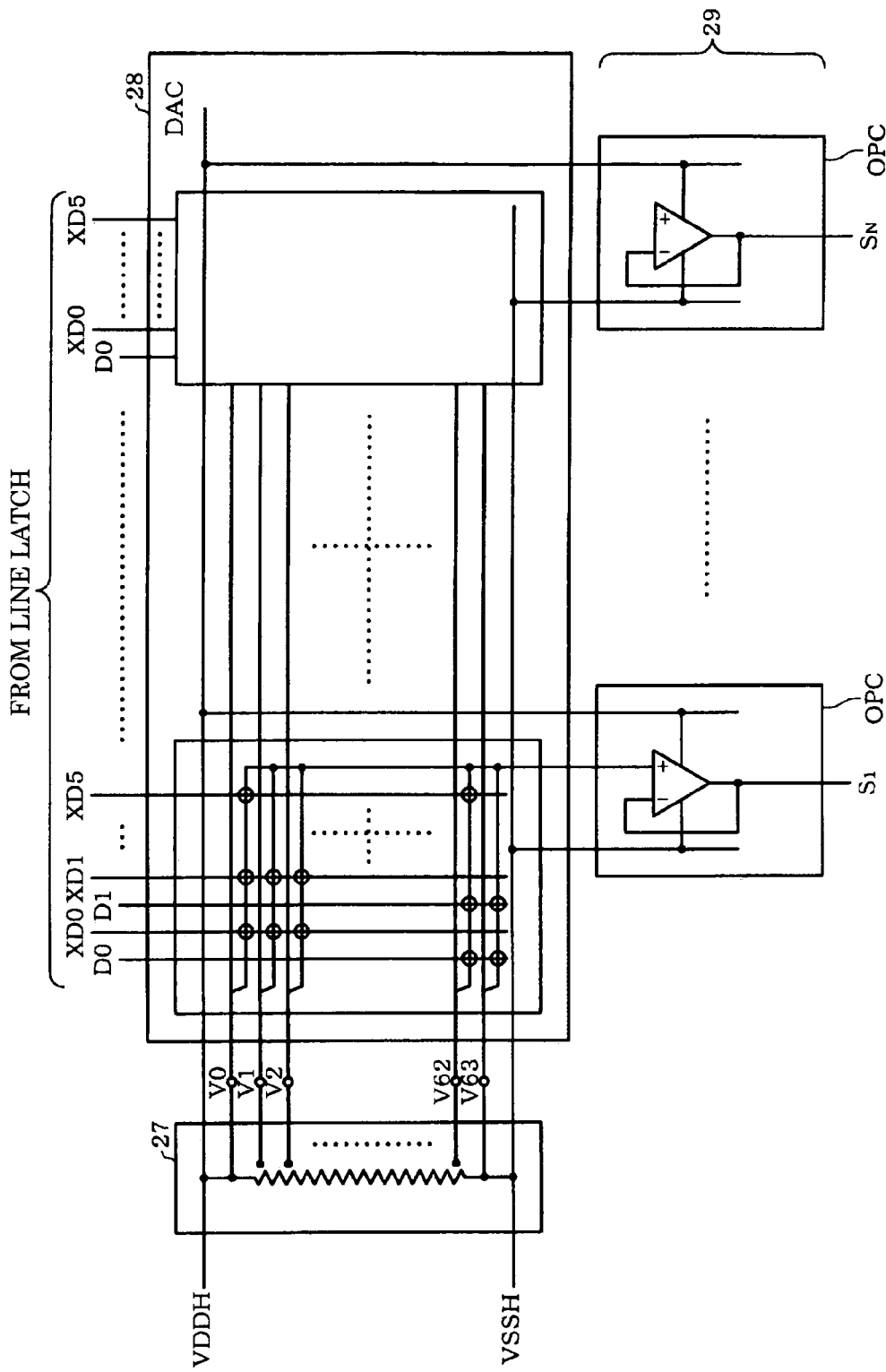
FIG. 5 is a view showing a configuration example of a reference voltage generation circuit, a DAC, and a source line driver circuit shown in FIG. 4.

FIG. 5 shows a configuration example of the reference voltage generation circuit 27, the DAC 28, and the source line driver circuit 29 shown in FIG. 4. In FIG. 5, the grayscale data is made up of 6-bit data D0 to D5, and inverted data of each bit of the grayscale data is indicated by XD0 to XD5. In FIG. 5, the same sections as in FIG. 4 are indicated by the same symbols. Description of these sections is appropriately omitted.

The reference voltage generation circuit 27 generates 64 different reference voltages by dividing the voltage between voltages VDDH and VSSH using resistors. The voltage VDDH may be a boosted voltage VOUT obtained by the power supply circuit 50. Each reference voltage corresponds to a grayscale value indicated by the 6-bit grayscale data. Each reference voltage is supplied in common to the source lines $S_1$ to $S_N$.

The DAC 28 includes decoders provided corresponding to the source lines. Each decoder outputs the reference voltage corresponding to the grayscale data to the operational amplifier OPC.

1.3 Power Supply Circuit

Figure 6:
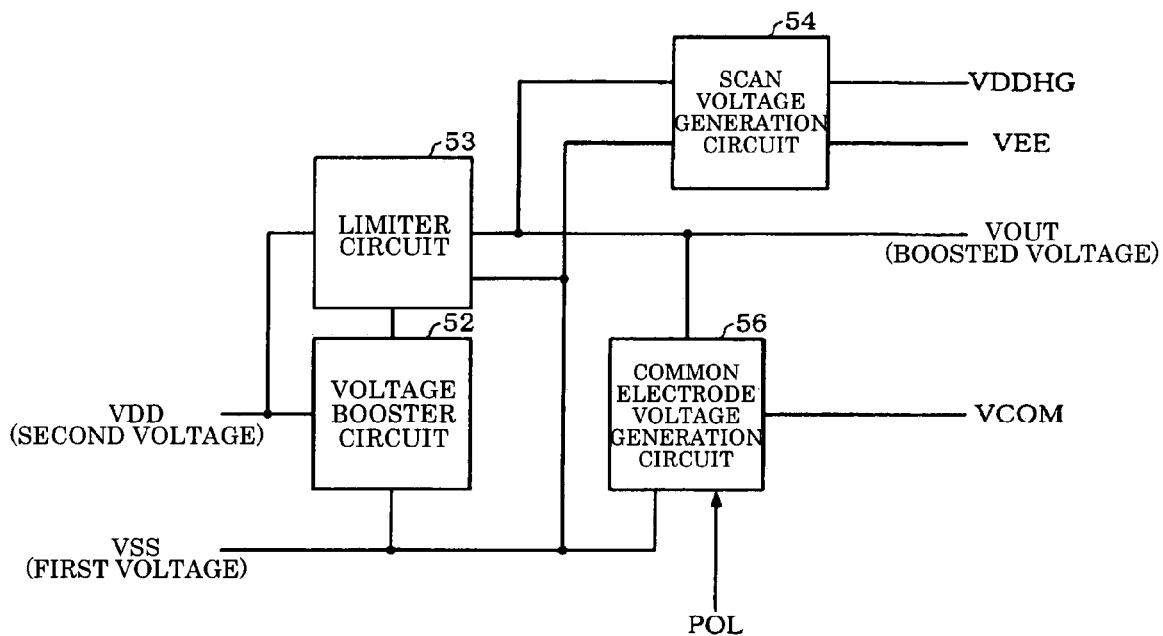
FIG. 6 is a view showing a configuration example of a power supply circuit shown in FIG. 1 or 2.

FIG. 6 shows a configuration example of the power supply circuit 50 shown in FIG. 1 or 2.

The power supply circuit 50 includes a voltage booster circuit 52, a limiter circuit 53, a scan voltage generation circuit 54, and a common electrode voltage generation circuit 56. A system ground power supply voltage VSS (first voltage) and a system power supply voltage VDD (second voltage) are supplied to the power supply circuit 50.

The system ground power supply voltage VSS and the system power supply voltage VDD are supplied to the voltage booster circuit 52. The voltage booster circuit 52 generates the power supply voltage VOUT (boosted voltage) by boosting the input voltage (e.g., system power supply voltage VDD) in the positive direction with respect to the system ground power supply voltage VSS by a factor of two, for example. Specifically, the voltage booster circuit 52 boosts the voltage difference between the system ground power supply voltage VSS and the input voltage (system power supply voltage VDD) by a factor of two. The voltage booster circuit 52 may be formed using a charge-pump circuit. The power supply voltage VOUT is supplied to the source driver 20, the scan voltage generation circuit 54, and the common electrode voltage generation circuit 56. The source driver 20 generates the grayscale voltage corresponding to the grayscale data based on the power supply voltage VOUT. The gate driver 30 may include the scan voltage generation circuit 54. In this case, the gate driver 30 generates the scan voltage based on the power supply voltage VOUT.

The limiter circuit 53 discharges a charge to or charges a charge from a power supply line to which the input voltage or the system power supply voltage VDD (second voltage) is supplied so that the power supply voltage VOUT (boosted voltage) generated by the voltage booster circuit 52 becomes a given target voltage. In this embodiment, since the voltage booster circuit 52 boosts the input voltage in the positive direction with respect to the system ground power supply voltage VSS, the limiter circuit 53 discharges a positive charge to (charges a negative charge from) the power supply line to which the input voltage or the voltage VOUT is supplied. Therefore, a charge can be recycled as compared with the case of discharging a charge to a power supply line to which the system ground power supply voltage VSS (first voltage) is supplied, whereby power consumption can be reduced. In this embodiment, the voltage booster circuit 52 is configured so that the boost capability can be changed.

The system ground power supply voltage VSS and the power supply voltage VOUT are supplied to the scan voltage generation circuit 54. The scan voltage generation circuit 54 generates the scan voltage. The scan voltage refers to a voltage applied to the gate line driven by the gate driver 30. The high-potential-side voltage and the low-potential-side voltage of the scan voltage are voltages VDDHG and VEE, respectively.

The common electrode voltage generation circuit 56 generates the common electrode voltage VCOM. The common electrode voltage generation circuit 56 outputs the high-potential-side voltage VCOMH or the low-potential-side voltage VCOML as the common electrode voltage VCOM based on a polarity inversion signal POL. The polarity inversion signal POL is generated by the display controller 40 in synchronization with the polarity inversion timing.

Figure 7:
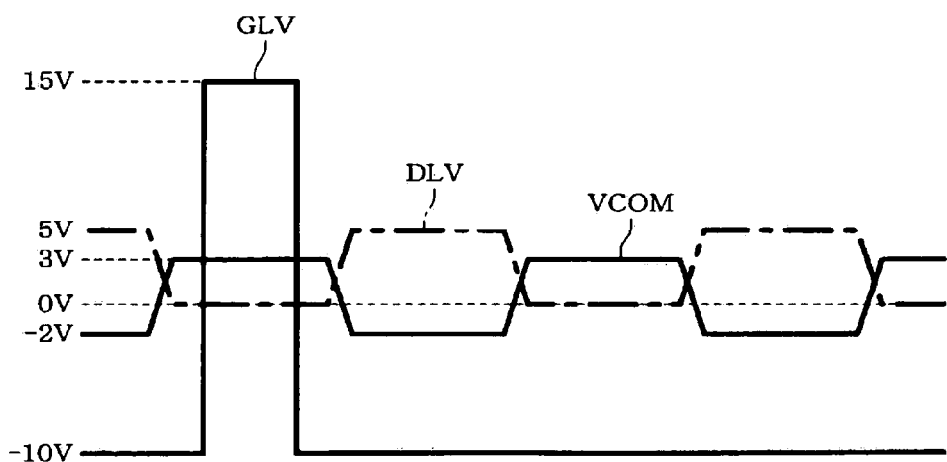
FIG. 7 is a view showing an example of a drive waveform of a display panel shown in FIG. 1 or 2.

FIG. 7 shows an example of the drive waveform of the display panel 12 shown in FIG. 1 or 2.

A grayscale voltage DLV corresponding to the grayscale value of the grayscale data is applied to the source line. In FIG. 7, the grayscale voltage DLV having an amplitude of 5 V with respect to the system ground power supply voltage VSS (=0 V) is applied to the source line.

A scan voltage GLV at the low-potential-side voltage VEE (=−10 V) is applied to the gate line in an unselected state as an unselect voltage, and a scan voltage GLV at the high-potential-side voltage VDDHG (=15 V) is applied to the gate line in a selected state as a select voltage.

The common electrode voltage VCOM at the high-potential-side voltage VCOMH (=3 V) or the low-potential-side voltage VCOML (=−2 V) is applied to the common electrode CE. The polarity of the voltage level of the common electrode voltage VCOM is reversed with respect to a given voltage in synchronization with the polarity inversion timing. FIG. 7 shows the waveform of the common electrode voltage VCOM during scan line inversion drive. The polarity of the grayscale voltage DLV applied to the source line is also reversed with respect to a given voltage in synchronization with the polarity inversion timing.

A liquid crystal element deteriorates when a direct-current voltage is applied to the liquid crystal element for a long period of time. Therefore, it is necessary to employ a drive method which reverses the polarity of the voltage applied to the liquid crystal element each time a given period has elapsed. As such a drive method, frame inversion drive, scan (gate) line inversion drive, data (source) line inversion drive, dot inversion drive, and the like are known.

Frame inversion drive reduces power consumption, but results in a poor image quality. Data line inversion drive and dot inversion drive ensure an excellent image quality, but require a high voltage for driving a display panel.

This embodiment employs scan line inversion drive. In scan line inversion drive, the polarity of the voltage applied to the liquid crystal element is reversed each time a scan period has elapsed (i.e., in scan line units). For example, a positive voltage is applied to the liquid crystal element in the first scan period (scan line), a negative voltage is applied to the liquid crystal element in the second scan period, and a positive voltage is applied to the liquid crystal element in the third scan period. In the subsequent frame, a negative voltage is applied to the liquid crystal element in the first scan period, a positive voltage is applied to the liquid crystal element in the second scan period, and a negative voltage is applied to the liquid crystal element in the third scan period.

In scan line inversion drive, the polarity of the voltage level of the common electrode voltage VCOM applied to the common electrode CE is reversed each time the scan period has elapsed.

Specifically, the voltage level of the common electrode voltage VCOM is set at the low-potential-side voltage VCOML in a positive period T1 (first period), and is set at the high-potential-side voltage VCOMH in a negative period T2 (second period), as shown in FIG. 8. The polarity of the grayscale voltage applied to the source line is also reversed at the above timing. Note that the voltage level of the low-potential-side voltage VCOML is the reverse of that of the high-potential-side voltage VCOMH with respect to a given voltage level.

The positive period T1 refers to a period in which the voltage level of the pixel electrode to which the grayscale voltage is supplied through the source line is higher than the voltage level of the common electrode CE. In the positive period T1, a positive voltage is applied to the liquid crystal element. The negative period T2 refers to a period in which the voltage level of the pixel electrode to which the grayscale voltage is supplied through the source line is lower than the voltage level of the common electrode CE. In the negative period T2, a negative voltage is applied to the liquid crystal element.

A voltage necessary for driving the display panel can be reduced by thus reversing the polarity of the common electrode voltage VCOM. This makes it possible to reduce the withstand voltage of the driver circuit, thereby simplifying the driver circuit manufacturing process and reducing the manufacturing cost.

The display driver 60 including the source driver 20, the gate driver 30, and the power supply circuit 50 can drive the display panel 12 in various display modes. Therefore, the display driver 60 includes a control register section (not shown).

FIG. 9 is a view illustrative of the control register section included in the display driver 60.

The display driver 60 may include a control register section 80 shown in FIG. 9. The control register section 80 includes a display mode setting register 82. The host or the display controller 40 can access the control register section 80 of the display driver 60. The host or the display controller 40 can designate a normal display mode as a high-load display mode or a partial display mode as a low-load display mode by setting control data in the display mode setting register 82 of the control register section 80.

Specifically, a control signal MODE corresponding to the control data set in the display mode setting register 82 is output from the control register section 80. The control signal MODE is supplied to each section of the display driver 60 so that each section can be controlled corresponding to the display mode.

Figure 10A:
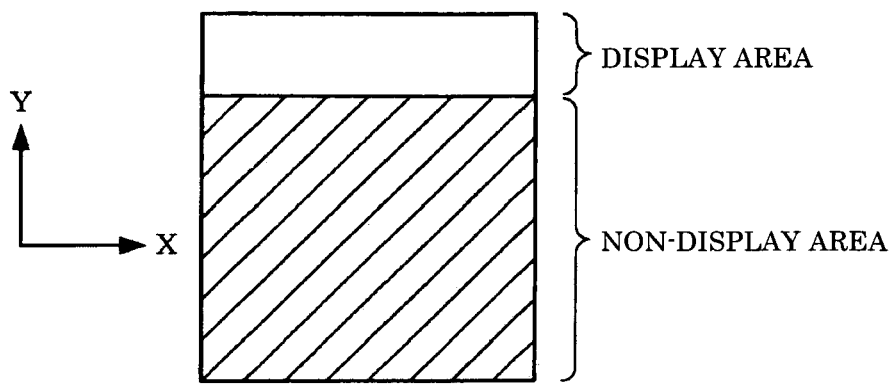
FIGS. 10A and 10B are views illustrative of a partial display mode.
Figure 10B:
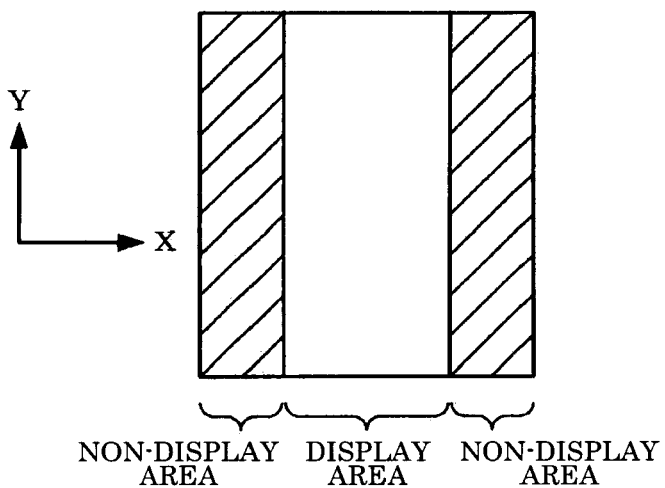

FIGS. 10A and 10B are views illustrative of the partial display mode.

A direction X and a direction Y in FIGS. 10A and 10B respectively correspond to the direction X and the direction Y in FIG. 1. In FIGS. 10A and 10B, a plurality of gate lines arranged in the direction Y extend in the direction X, and a plurality of source lines arranged in the direction X extend in the direction Y. In the partial display mode shown in FIG. 10A, some of the gate lines are not selected in one vertical scan period so that a display area and a non-display area are formed in the vertical scan direction. This makes it unnecessary to apply the select voltage to the gate lines in the non-display area, whereby power consumption can be reduced. In the partial display mode shown in FIG. 10B, a given non-display voltage is supplied to some of the source lines in one horizontal scan period so that a display area and a non-display area are formed in the horizontal scan direction. This reduces power consumption accompanied by driving the source lines in the non-display area.

2. Configuration Example of Power Supply Circuit

When regulating the potential of the voltage boosted by the power supply circuit, a voltage of which the potential has been regulated using a regulator may be boosted, or the potential of the boosted voltage may be limited using the limiter circuit. When boosting a voltage of which the potential has been regulated using the regulator, since the regulator can be operated at a low voltage, power consumption can be reduced. On the other hand, the voltage range of the boosted voltage is reduced. When limiting the potential of the boosted voltage using the limiter circuit, the voltage range of the boosted voltage is not reduced. On the other hand, the limiter circuit constantly operates and consumes power. Therefore, the output load current of the power supply circuit differs depending on a display image or a display mode which determines the output load of the power supply circuit.

Figure 11:
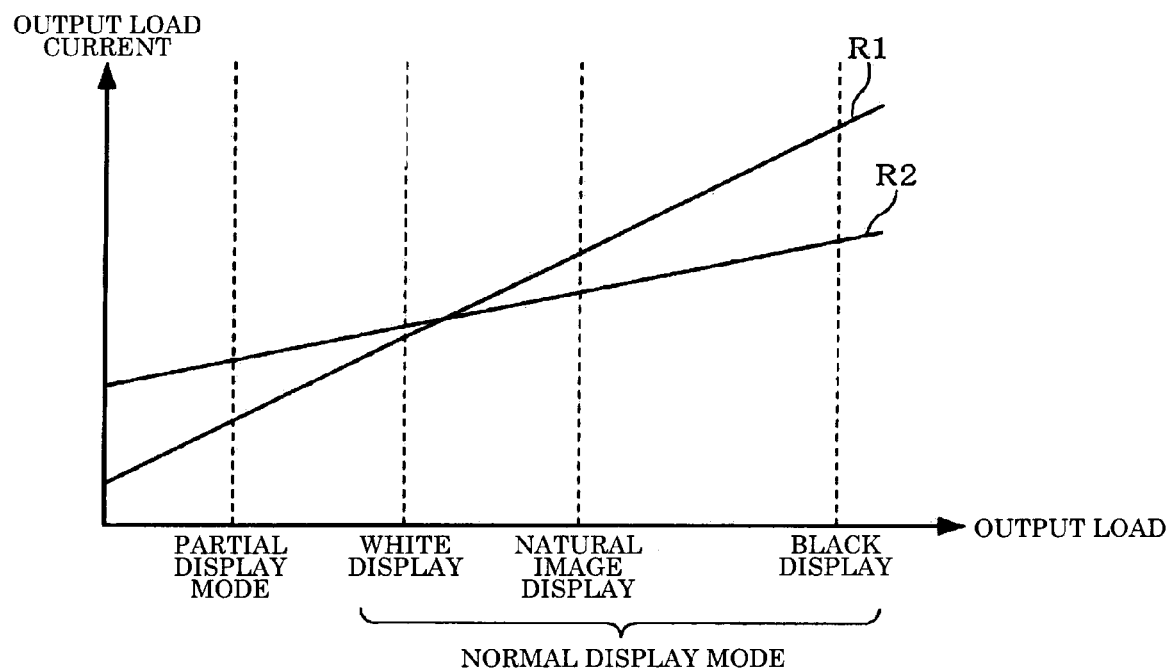
FIG. 11 is a view schematically showing the relationship between an output load and an output load current of a power supply circuit.

FIG. 11 schematically shows the relationship between the output load and the output load current of the power supply circuit.

FIG. 11 shows the relationship between the output load and the output load current of the power supply circuit when the display panel 12 is a normally-white panel. The output load increases from the left to right. Specifically, the output load of the power supply circuit when the display panel 12 is driven in the partial display mode is lower than the output load of the power supply circuit when the display panel 12 is driven in the normal display mode.

When the display panel 12 is driven in the normal display mode, the output load of the power supply circuit differs depending on the display image. When the display panel 12 is a normally-white panel, the output load of the power supply circuit increases in the order from the case where the entire display area is a white display, the case where the entire display area is a natural image display, and the case where the entire display area is a black display, as shown in FIG. 11.

An increase in output load current corresponding to the output load of the power supply circuit 50 differs depending on the method of regulating the potential of the boosted voltage employed for the power supply circuit 50. For example, when boosting a voltage of which the potential has been regulated using the regulator, the output load current is small when the output load is low, and increases as the output load increases (R1 in FIG. 11). This is considered to be because the voltage booster circuit cannot sufficiently exhibit a capability of supplying a charge to the load as the output load increases. Therefore, the boost efficiency decreases as the output load increases.

On the other hand, when limiting the potential of the boosted voltage using the limiter circuit, since the limiter circuit constantly consumes current, the output load current increases even when the output load is low. However, the output load current does not increase to a large extent even if the output load increases (R2 in FIG. 11). This is considered to be because the load can be sufficiently driven by the charge supply capability of an operational amplifier included in the limiter circuit even if the output load increases, for example. Therefore, the boost efficiency does not decrease to a large extent even if the output load increases.

As is clear from the relationship shown in FIG. 11, the power supply circuit achieves a higher boost efficiency in the partial display mode when boosting a voltage of which the potential has been regulated using the regulator. In the normal display mode, the power supply circuit achieves a higher boost efficiency when limiting the potential of the boosted voltage using the limiter circuit almost irrespective of the display image.

Therefore, if the charge supply capability of the power supply circuit is designed based on the normal display mode by the method of limiting the potential of the boosted voltage using the limiter circuit which achieves a higher boost efficiency, the boost efficiency of the power supply circuit in the partial display mode decreases.

In this embodiment, the boosting method for the power supply circuit can be changed corresponding to the display mode. Therefore, the boosted voltage can be generated in each display mode using a boosting method with a high boost efficiency, whereby the boosted voltage can be supplied without decreasing the boost efficiency.

The main portion of the power supply circuit 50 according to this embodiment is described below.

2.1 First Configuration Example

Figure 12:
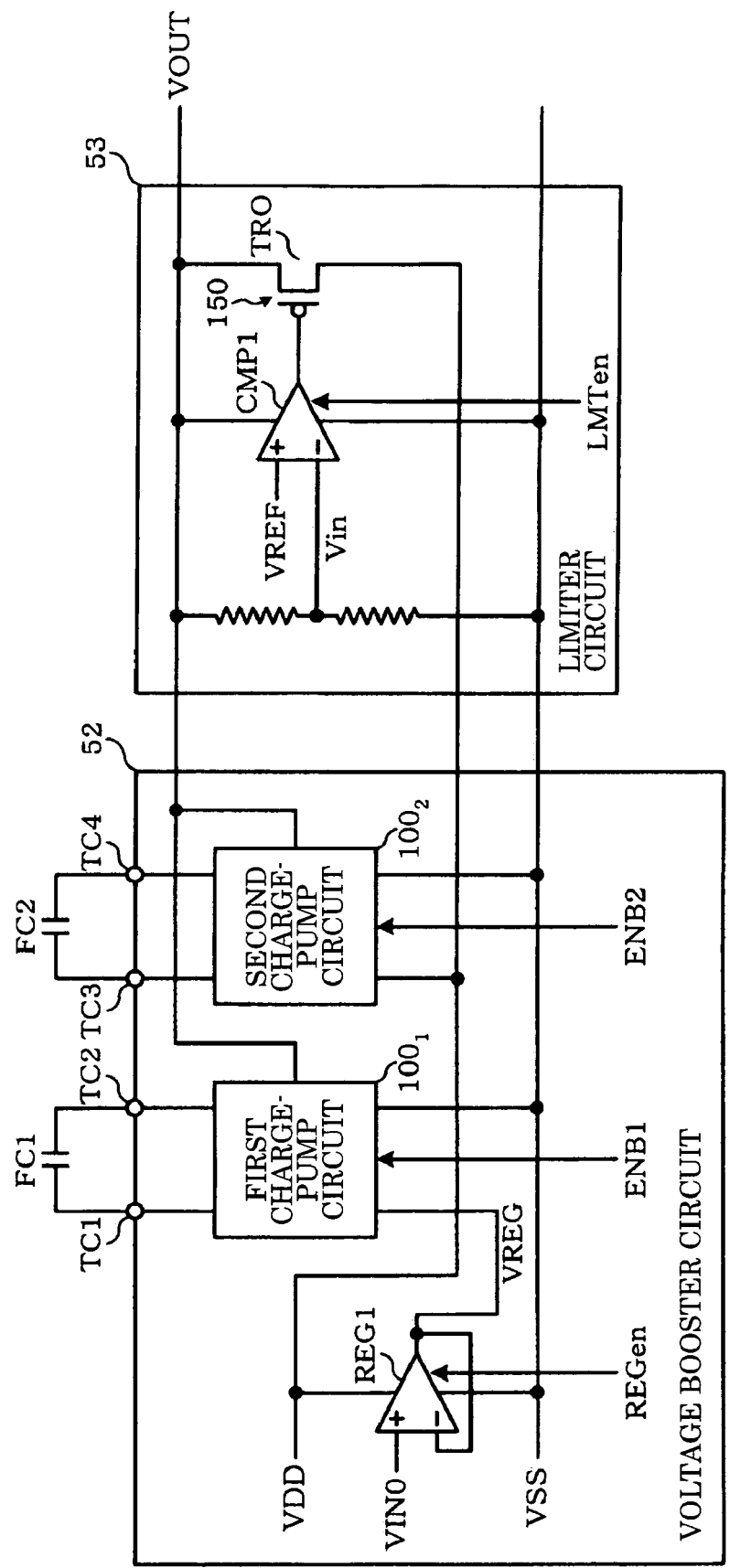
FIG. 12 is a view showing a configuration example of a voltage booster circuit and a limiter circuit of a power supply circuit according to a first configuration example of one embodiment of the invention.

FIG. 12 shows the voltage booster circuit 52 and the limiter circuit 53 of the power supply circuit 50 according to a first configuration example of this embodiment.

The voltage booster circuit 52 includes a plurality of charge-pump circuits which differ in boost capability. The boost capability of the voltage booster circuit 52 can be changed by enabling/disabling the operations of the charge-pump circuits using control signals ENB1 and ENB2.

As shown in FIG. 12, the voltage booster circuit 52 includes a regulator REG1 and first and second charge-pump circuits $100_1$ and $100_2$, for example. A first flying capacitor FC1 used for the charge-pump operation of the first charge-pump circuit $100_1$ is connected to external connection terminals TC1 and TC2 of the voltage booster circuit 52 (power supply circuit 50). A second flying capacitor FC2 used for the charge-pump operation of the second charge-pump circuit $100_2$ is connected to external connection terminals TC3 and TC4 of the voltage booster circuit 52 (power supply circuit 50).

The capacitance of the second flying capacitor FC2 is larger than the capacitance of the first flying capacitor FC1. The size (channel length×channel width) of a transistor which forms the first charge-pump circuit $100_1$ is smaller than the size of a transistor which forms the second charge-pump circuit $100_2$. The current drive capability of the transistor which forms the first charge-pump circuit $100_1$ is lower than the current drive capability of the transistor which forms the second charge-pump circuit $100_2$. This enables the boost capability of the first charge-pump circuit $100_1$ to be reduced as compared with the boost capability of the second charge-pump circuit $100_2$.

The operation of the regulator REG1 is enabled/disabled based on a control signal REG1en. The high-potential-side power supply voltage of the regulator REG1 is the system power supply voltage VDD, and the low-potential-side power supply voltage of the regulator REG1 is the system ground power supply voltage VSS. The regulator REG1 is a voltage-follower-connected operational amplifier. A given input voltage VIN0 is input to a non-inverting input terminal of the operational amplifier. An output voltage VREG from the regulator REG1 is supplied to the first charge-pump circuit $100_1$.

The first charge-pump circuit $100_1$ enabled based on the control signal ENB1 generates the power supply voltage VOUT by boosting the voltage between the system ground power supply voltage VSS and the output voltage VREG from the regulator REG1 with respect to the system ground power supply voltage VSS by a factor of two, for example.

The second charge-pump circuit $100_2$ enabled based on the control signal ENB2 generates the power supply voltage VOUT by boosting the voltage between the system ground power supply voltage VSS and the system power supply voltage VDD with respect to the system ground power supply voltage VSS by a factor of two, for example.

Figure 13:
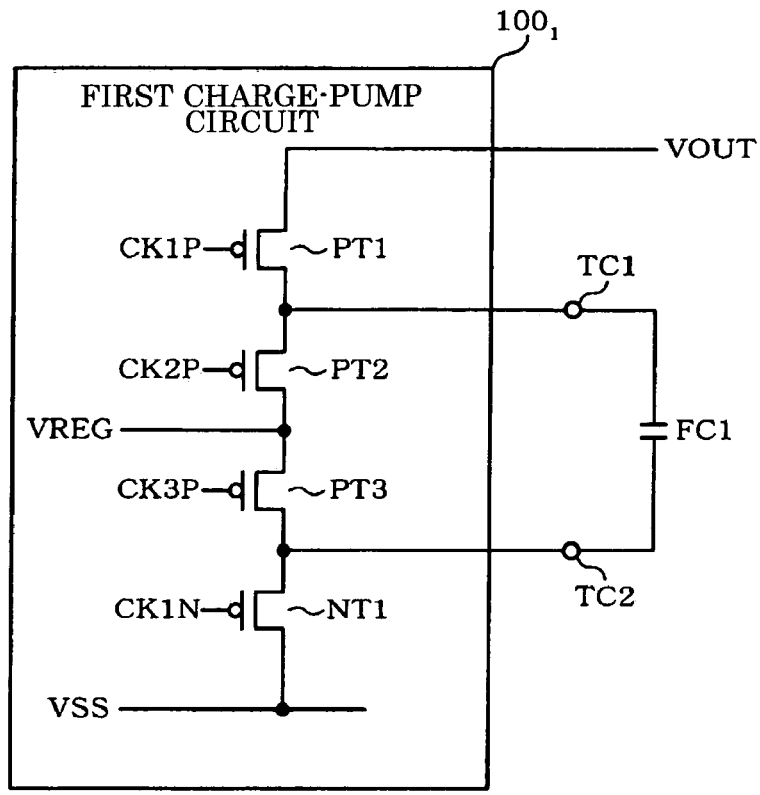
FIG. 13 is a circuit diagram showing a configuration example of a first charge-pump circuit shown in FIG. 12.

FIG. 13 is a circuit diagram showing a configuration example of the first charge-pump circuit $100_1$ shown in FIG. 12.

Note that the second charge-pump circuit $100_2$ has the same configuration as that of the first charge-pump circuit $100_1$ shown in FIG. 13 except that the system power supply voltage VDD is used for the second charge-pump circuit $100_2$ instead of the output voltage VREG from the regulator REG1.

The first charge-pump circuit $100_1$ includes transistors (switching elements) for generating the boosted voltage by a charge-pump operation using a charge stored in the first flying capacitor FC1. Specifically, the first charge-pump circuit $100_1$ includes P-type (first conductivity type in a broad sense) MOS transistors (hereinafter simply referred to as "transistors") PT1 and PT2 inserted in series between an output power supply line to which the boosted voltage is output and a power supply line to which the voltage VREG is supplied. The first charge-pump circuit $100_1$ also includes a P-type MOS transistor PT3 and an N-type (second conductivity type in a broad sense) MOS transistor (hereinafter simply referred to as "transistor") NT1 inserted in series between the power supply line to which the voltage VREG is supplied and a power supply line to which the system ground power supply voltage VSS is supplied.

A charge clock signal CK1P is supplied to the gate of the transistor PT1. A charge clock signal CK2P is supplied to the gate of the transistor PT2. A charge clock signal CK3P is supplied to the gate of the transistor PT3. A charge clock signal CK1N is supplied to the gate of the transistor NT1.

The power supply line to which the boost voltage is output is connected to the source of the transistor PT1. One end of the first flying capacitor FC1 is connected to a connection node of the transistors PT1 and PT2 through the terminal TC1. The other end of the first flying capacitor FC1 is connected to a connection node of the transistors PT3 and NT1 through the terminal TC2.

Figure 14:
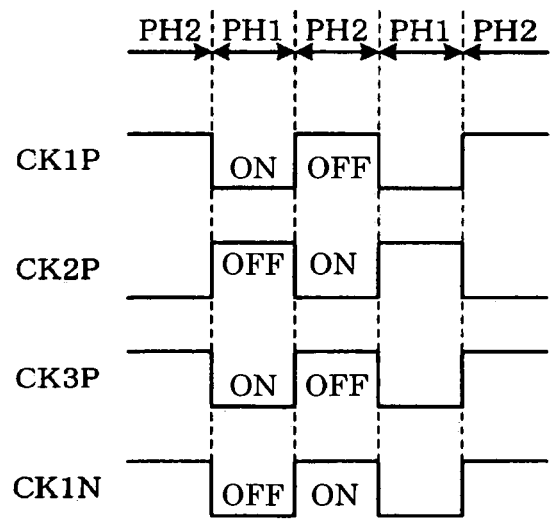
FIG. 14 is a view schematically showing timing of charge clock signals shown in FIG. 13.

FIG. 14 schematically shows timings of the charge clock signals CK1P, CK2P, CK3P, and CK1N shown in FIG. 13.

When the charge clock signal CK1P is set at the L level, the charge clock signal CK2P is set at the H level, and the charge clock signals CK3P and CK1N are set at the L level (period PH1). When the charge clock signal CK1P is set at the H level, the charge clock signal CK2P is set at the H level, and the charge clock signals CK3P and CK1N are set at the H level (period PH2).

In the period PH1, the transistor PT1 is turned ON and the transistor PT2 is turned OFF, whereby the voltage at one end of the first flying capacitor FC1 connected to the first charge-pump circuit $100_1$ through the terminal TC1 is output to the output power supply line. In this case, the transistor PT3 is turned ON and the transistor NT1 is turned OFF, whereby the voltage VREG is supplied to the other end of the first flying capacitor FC1 connected to the first charge-pump circuit $100_1$ through the external connection terminal TC2.

In the period PH2, the transistor PT1 is turned OFF and the transistor PT2 is turned ON, whereby the voltage VREG is supplied to one end of the first flying capacitor FC1 connected to the first charge-pump circuit $100_1$ through the terminal TC1. In this case, the transistor PT3 is turned OFF and the transistor NT1 is turned ON, whereby the system ground power supply voltage VSS is supplied to the other end of the first flying capacitor FC1 connected to the first charge-pump circuit $100_1$ through the external connection terminal TC2. Therefore, a charge corresponding to the voltage between the voltage VREG and the system ground power supply voltage VSS is stored in the first flying capacitor FC1 in the period PH2.

In the period PH1, the voltage at one end of the first flying capacitor FC1 is again output to the output power supply line. In this case, since the other end of the first flying capacitor FC1 connected to the external connection terminal TC2 is set at the voltage VREG, the output power supply line is set at a voltage twice the voltage between the voltage VREG and the system ground power supply voltage VSS.

It is desirable to change the charge clock signals CK1P and CK2P so that the transistors PT1 and PT2 are not turned ON at the same time. It is also desirable to change the charge clock signals CK2P and CK3P so that the transistors PT2 and PT3 are not turned ON at the same time. It is also desirable to change the charge clock signals CK3P and CK1N so that the transistors PT3 and NT1 are not turned ON at the same time.

Again referring to FIG. 12, the limiter circuit 53 shown in FIG. 12 includes a comparator CMP1 and a voltage limiter circuit 150.

An input voltage Vin obtained by dividing the voltage between the voltage VOUT and the system ground power supply voltage VSS using resistors and a given reference voltage VREF are input to the comparator CMP1. The comparator CMP1 outputs a comparison result between the input voltage Vin and the reference voltage VREF as a comparison result pulse. The operation of the comparator CMP1 is enabled/disabled based on a control signal LMTen. The operation of the limiter circuit 53 is also enabled/disabled based on the control signal LMTen.

The voltage limiter circuit 150 includes a P-type MOS transistor TRO. The comparison result pulse from the comparator CMP1 is input to the gate of the P-type MOS transistor TRO. A power supply line to which the voltage VOUT is supplied is connected to the source of the P-type MOS transistor TRO. A power supply line to which the system power supply voltage VDD is supplied is connected to the drain of the P-type MOS transistor TRO.

Figure 15:
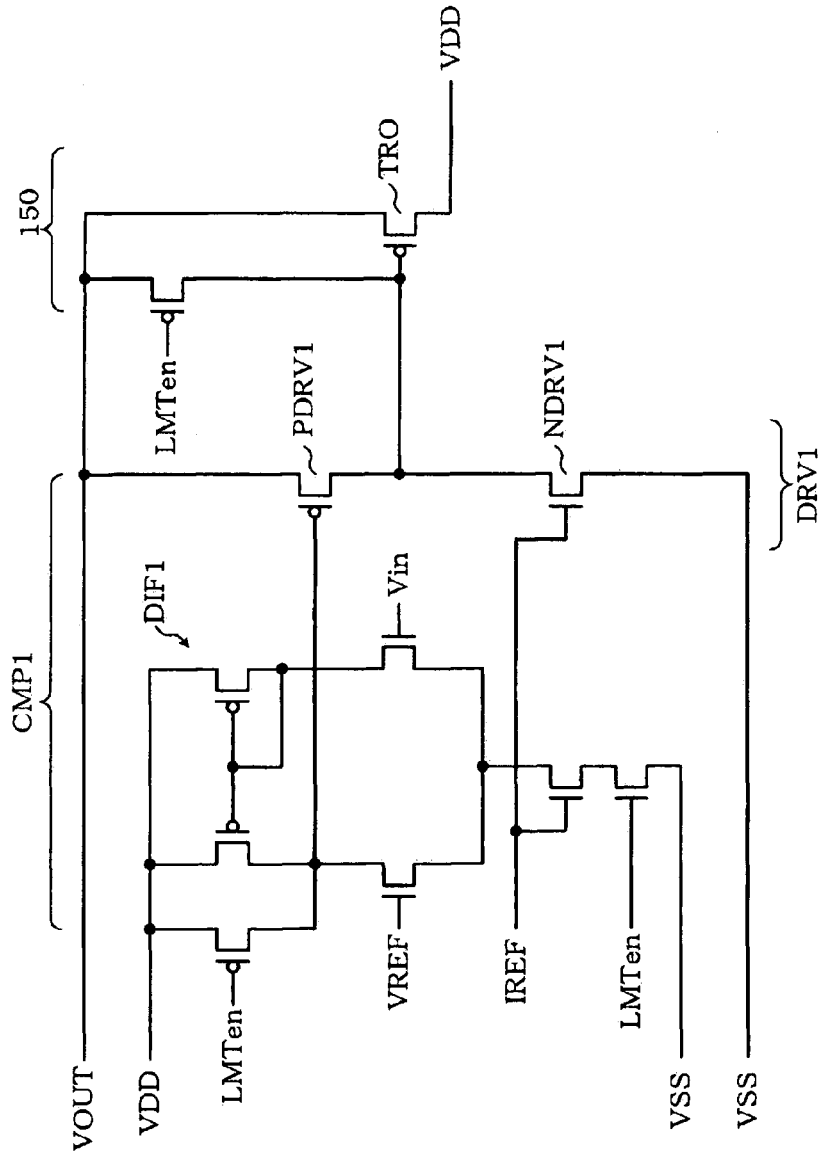
FIG. 15 is a circuit diagram showing a configuration example of a comparator and a voltage limiter circuit shown in FIG. 12.

FIG. 15 is a circuit diagram showing a configuration example of the comparator CMP1 and the voltage limiter circuit 150 shown in FIG. 12.

The comparator CMP1 includes a differential amplifier DIF1 and an output circuit DRV1. The differential amplifier DIF1 includes a differential transistor pair of which the sources are connected, a current source transistor which supplies a current to the sources of the differential transistor pair, and a current-mirror circuit which supplies a current to each transistor of the differential transistor pair. The reference voltage VREF is supplied to the gate of the transistor which serves as a non-inverting input terminal of the differential transistor pair, and the input voltage Vin is supplied to the gate of the transistor which serves as an inverting input terminal of the differential transistor pair. The output circuit DRV1 includes a P-type MOS transistor PDRV1 and an N-type MOS transistor NDRV1 connected in series. A voltage identical to the gate voltage of the current source transistor of the differential amplifier DIF1 is supplied to the gate of the N-type MOS transistor NDRV1 to drive the drain of the P-type MOS transistor PDRV1. The output voltage from the differential amplifier DIF1 is supplied to the gate of the P-type MOS transistor PDRV1.

The drain voltage of the P-type MOS transistor PDRV1 of the output circuit DRV1 is supplied to the gate of the P-type MOS transistor TRO of the voltage limiter circuit 150.

When the limiter circuit 53 is disabled based on the control signal LMTen, the output node of the differential amplifier DIF1 is fixed at the system power supply voltage VDD, for example. When the limiter circuit 53 is disabled based on the control signal LMTen, the current source transistor is set in a non-conducting state. When the limiter circuit 53 is disabled based on the control signal LMTen, the gate voltage of the P-type MOS transistor TRO is fixed at the source voltage of the P-type MOS transistor TRO.

When the limiter circuit 53 is enabled based on the control signal LMTen and the input voltage Vin is higher in potential than the reference voltage VREF, the potential of the output voltage from the differential amplifier DIF1 increases so that the impedance of the P-type MOS transistor PDRV1 increases. As a result, the potential of the comparison result pulse (output from the comparator CMP1) decreases. In this case, the impedance of the P-type MOS transistor TRO decreases so that the amount of charge discharged to the power supply line to which the system power supply voltage VDD is supplied increases.

When the limiter circuit 53 is enabled based on the control signal LMTen and the input voltage Vin is lower in potential than the reference voltage VREF, the potential of the output voltage from the differential amplifier DIF1 decreases so that the impedance of the P-type MOS transistor PDRV1 decreases. As a result, the potential of the comparison result pulse (output from the comparator CMP1) increases. In this case, the impedance of the P-type MOS transistor TRO increases so that the amount of charge discharged to the power supply line to which the system power supply voltage VDD is supplied decreases.

The power supply circuit 50 includes a power supply circuit control section (not shown), and generates a control signal for each section of the power supply circuit.

Figure 16:
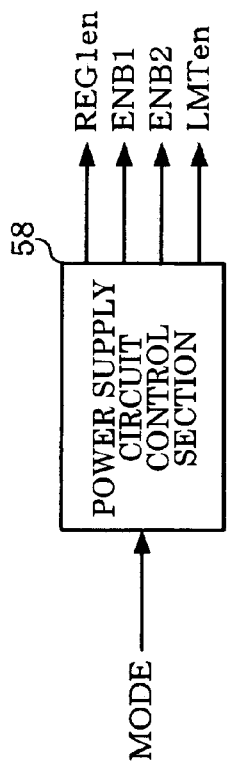
FIG. 16 is a view schematically showing the configuration of a power supply circuit control section of a power supply circuit according to a first configuration example.

FIG. 16 schematically shows the configuration of a power supply circuit control section 58 of the power supply circuit 50.

The power supply circuit control section 58 generates the control signals REG1en, ENB1, ENB2, and LMTen based on the control signal MODE from the display mode setting register 82. The power supply circuit control section 58 includes a known combinational circuit.

Figures 17, 18:
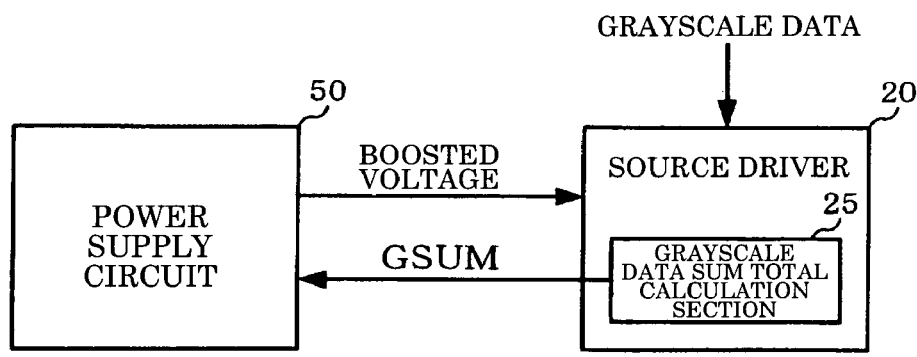
FIG. 17 is a view illustrative of the operation of a power supply circuit control section shown in FIG. 16.
FIG. 18 shows the main portion of a liquid crystal display device according to a second configuration example of one embodiment of the invention.

FIG. 17 is a view illustrative of the operation of the power supply circuit control section 58 shown in FIG. 16.

In the first configuration example, when the normal display mode (high-load display mode) is designated based on the control signal MODE, the regulator REG1 is disabled based on the control signal REG1en, the first charge-pump circuit $100_1$ is enabled or disabled based on the control signal ENB1, the second charge-pump circuit $100_2$ is enabled based on the control signal ENB2, and the limiter circuit 53 is enabled based on the control signal LMTen.

When the partial display mode (low-load display mode) is designated based on the control signal MODE, the regulator REG1 is enabled based on the control signal REG1en, the first charge-pump circuit $100_1$ is enabled based on the control signal ENB1, the second charge-pump circuit $100_2$ is disabled based on the control signal ENB2, and the limiter circuit 53 is disabled based on the control signal LMTen.

Specifically, when the drive voltage of the display panel 12 is generated based on the boosted voltage VOUT generated by the power supply circuit 50, when the display panel 12 is driven in the normal display mode, the power supply circuit 50 outputs a voltage obtained by limiting the potential of the boosted voltage VOUT with the limiter circuit 53 as the boosted voltage. When the display panel 12 is driven in the partial display mode (low-load display mode), the power supply circuit 50 outputs a voltage obtained by boosting the output voltage VREG from the regulator REG1 using the voltage booster circuit 52 as the boosted voltage without limiting the potential of the voltage using the limiter circuit 53. This enables the boosted voltage to be generated in each display mode using a boosting method with a high boost efficiency, whereby the boosted voltage can be supplied without decreasing the boost efficiency.

Specifically, when the display panel 12 is driven in the normal display mode, the power supply circuit 50 outputs the boosted voltage generated by the first and second charge-pump circuits $100_1$ and $100_2$ or the boosted voltage generated by the second charge-pump circuit $100_2$. When the display panel 12 is driven in the partial display mode, the power supply circuit 50 outputs the boosted voltage generated by the first charge-pump circuit $100_1$. Therefore, the boosted voltage can be generated with a high boost capability when the output load of the power supply circuit 50 is high, and can be generated with a low boost capability when the output load of the power supply circuit 50 is low, whereby the boosted voltage can be stably supplied without decreasing the boost efficiency to a large extent.

2.2 Second Configuration Example

In the first configuration example, the boosted voltage is generated in the normal display mode without changing the boost capability corresponding to the output load of the power supply circuit 50. Therefore, a situation may occur in which the boost capability becomes insufficient when the output load of the power supply circuit 50 increases, whereby the boost efficiency decreases. According to a second configuration example, the boost capability of the voltage booster circuit is changed corresponding to the output load of the power supply circuit 50 when the display panel 12 is driven in the normal display mode, and the boost capability of the voltage booster circuit is not changed corresponding to the output load of the power supply circuit 50 when the display panel 12 is driven in the partial display mode. This prevents a situation in which the boost efficiency decreases with respect to the output load while preventing a decrease in boost capability when the output load of the power supply circuit 50 is high.

FIG. 18 shows the main portion of the configuration of a liquid crystal display device according to the second configuration example of this embodiment. In FIG. 18, the same sections as in FIG. 1 or 2 are indicated by the same symbols. Description of these sections is appropriately omitted. Note that illustration and description of other blocks of the liquid crystal display device are omitted.

In the second configuration example, the drive voltage applied to the source line of the display panel 12 is generated based on the boosted voltage VOUT, and the power supply circuit 50 compares a sum total data GSUM (i.e., evaluation value for evaluating the output load) with a given threshold value to determine whether or not to change the boost capability. The sum total data GSUM is calculated by a grayscale data sum total calculation section 25 of the source driver 20. The power supply circuit 50 changes the boost capability based on the sum total data GSUM, and supplies the boosted voltage to the source driver 20.

Specifically, the power supply circuit 50 decreases the boost capability when the power supply circuit 50 has determined that the boost capability is high with respect to the output load of the power supply circuit 50, and increases the boost capability when the power supply circuit 50 has determined that the boost capability is low with respect to the output load of the power supply circuit 50.

The following description focuses on the difference between the second configuration example and the first configuration example. Description of identical sections is appropriately omitted.

Figure 19:
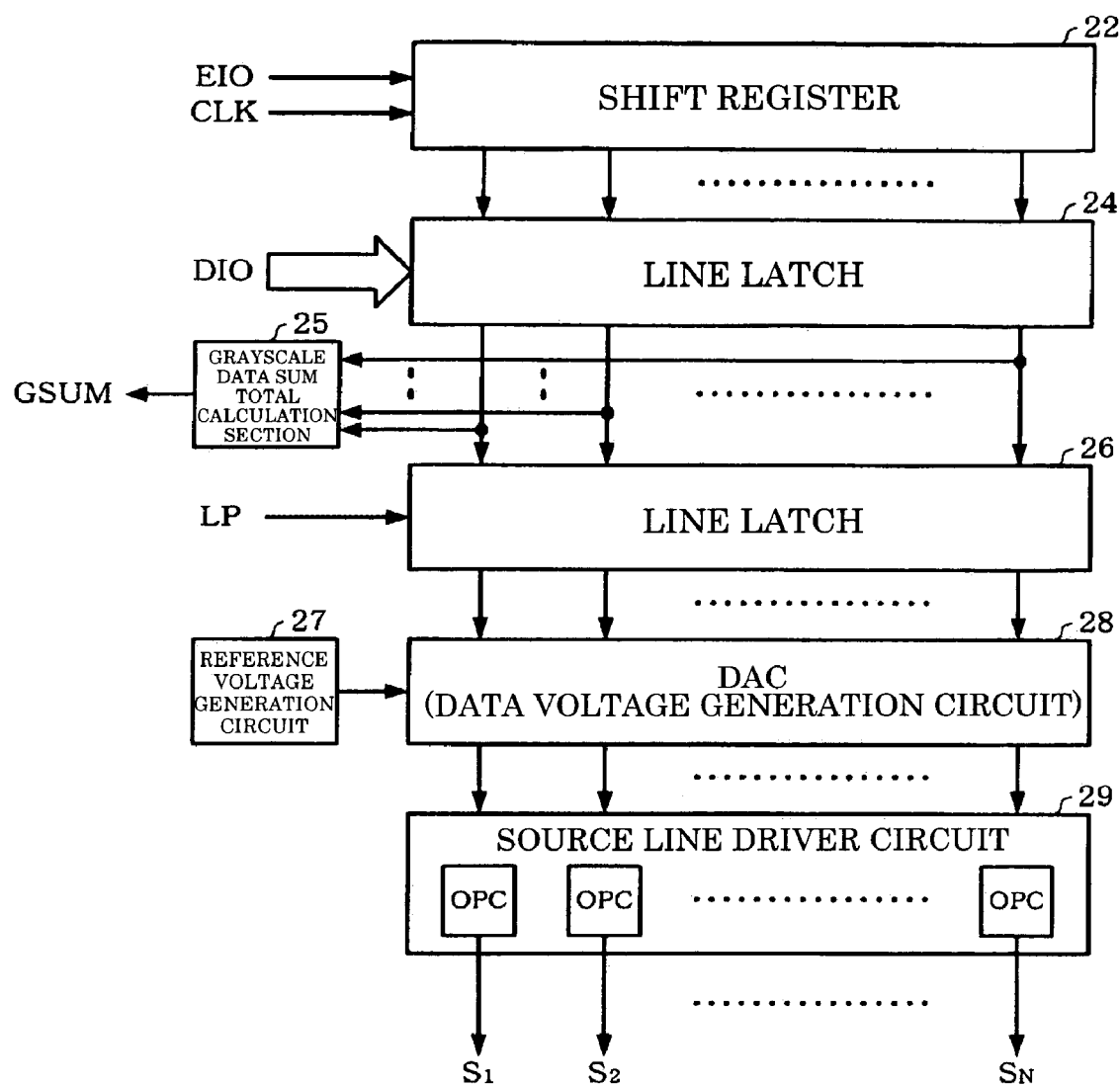
FIG. 19 is a block diagram showing a source driver according to a second configuration example.

FIG. 19 is a block diagram showing the source driver according to the second configuration example shown in FIG. 18. In FIG. 19, the same sections as in FIG. 4 are indicated by the same symbols. Description of these sections is appropriately omitted.

The source driver according to the second configuration example differs from the source driver according to the first configuration example in that the source driver according to the second configuration example includes the grayscale data sum total calculation section 25.

The grayscale data sum total calculation section 25 calculates an evaluation value for evaluating the output load of the power supply circuit 50 based on the grayscale data. The evaluation value is supplied to the power supply circuit 50 as the sum total data GSUM. Specifically, the grayscale data sum total calculation section 25 calculates the evaluation value by adding up the grayscale data corresponding to one scan line. For example, the grayscale data sum total calculation section 25 adds up the grayscale data latched by the line latch 26 corresponding to the source outputs to calculate the sum total data as the evaluation value. The grayscale voltage used to drive the display panel 12 can be roughly evaluated based on the sum total data as the evaluation value. Therefore, the sum total data can be used to evaluate the output load of the power supply circuit 50.

Figure 20:
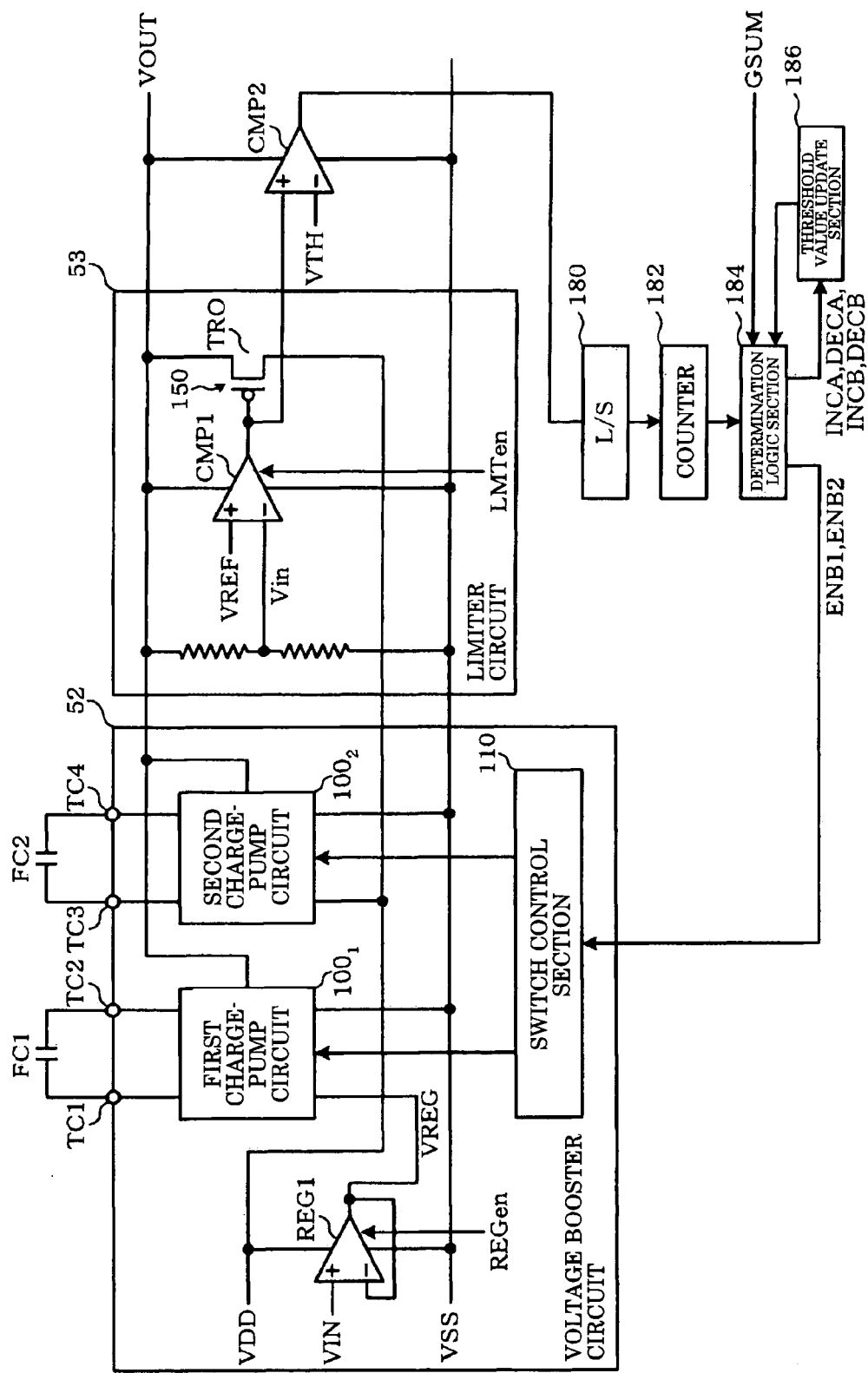
FIG. 20 is a view showing a configuration example of a voltage booster circuit and a limiter circuit of a power supply circuit according to a second configuration example.

FIG. 20 shows the voltage booster circuit 52 and the limiter circuit 53 of the power supply circuit 50 according to the second configuration example.

The voltage booster circuit 52 according to the second configuration example differs from the voltage booster circuit 52 according to the first configuration example in that the voltage booster circuit 52 according to the second configuration example includes a switch control section 110.

The switch control section 110 enables/disables the first and second charge-pump circuits 100₁ and 100₂. Specifically, the switch control section 110 enables one of the first and second charge-pump circuits 100₁ and 100₂, or enables both of the first and second charge-pump circuits 100₁ and 100₂. Therefore, the switch control section 110 can select the boost capability of the voltage booster circuit 52 from three states. The switch control section 110 changes the boost capability of the voltage booster circuit 52 corresponding to the output load of the power supply circuit 50.

FIG. 21 is a view illustrative of the operation of the power supply circuit control section 58 of the power supply circuit according to the second configuration example.

In the second configuration example, when the normal display mode (high-load display mode) is designated based on the control signal MODE, the regulator REG1 is disabled based on the control signal REG1*en*, and the limiter circuit 53 is enabled based on the control signal LMT*en*. The first and second charge-pump circuits 100₁ and 100₂ are enabled/disabled corresponding to the output load of the power supply circuit 50. Specifically, when the normal display mode is designated, the voltage booster circuit 52 of the power supply circuit 50 changes the boost capability based on the output load of the power supply circuit 50 and limiter operation information which indicates whether or not the limiter circuit 53 has limited the potential of the boosted voltage.

When the partial display mode (low-load display mode) is designated based on the control signal MODE, the regulator REG1 is enabled based on the control signal REG1*en*, the first charge-pump circuit 100₁ is enabled based on the control signal ENB1, the second charge-pump circuit 100₂ is disabled based on the control signal ENB2, and the limiter circuit 53 is disabled based on the control signal LMT*en*. This prevents a situation in which the boost efficiency decreases with respect to the output load while preventing a decrease in boost capability when the output load of the power supply circuit 50 is high.

The power supply circuit 50 according to the second configuration example further includes a comparator CMP2, a level shifter 180, a counter 182, a determination logic section 184, and a threshold value update section 186.

The comparator CMP2 determines the period in which the voltage limiter circuit 150 of the limiter circuit 53 has regulated the voltage based on the comparison result pulse output from the comparator CMP1 to detect the operation information relating to the limiter circuit 53.

FIG. 22 is a view illustrative of the comparison result pulse output from the comparator CMP1.

As shown in FIG. 22, the comparison result pulse is a pulse signal. When the input voltage Vin is higher in potential than the reference voltage VREF, the comparison result pulse is set at the L level (i.e., a charge is discharged to the power supply line to which the system power supply voltage VDD is supplied). When the input voltage Vin is lower in potential than the reference voltage VREF, the comparison result pulse is set at the H level (i.e., a charge is not discharged to the power supply line to which the system power supply voltage VDD is supplied).

As described above, when the input voltage Vin is higher in potential than the reference voltage VREF, the P-type MOS transistor TRO is turned ON, whereby the limiter circuit 53 discharges a charge of the power supply line to which the voltage VOUT is supplied to the power supply line to which the system power supply voltage VDD is supplied.

The power supply circuit 50 according to the second configuration example compares the sum total data GSUM (i.e., evaluation value for evaluating the output load) with a given threshold value to determine whether or not to change the boost capability, as described above. The threshold value is updated based on the limiter operation information which indicates whether or not the limiter circuit 53 has limited the potential of the voltage VOUT (i.e., boosted voltage). Therefore, the power supply circuit 50 can change the boost capability of the voltage booster circuit 52 based on the output load of the power supply circuit 50 and the limiter operation information.

In FIG. 20, the comparison result pulse from the limiter circuit 53 and a given threshold voltage VTH are input to the comparator CMP2. When the high-potential-side power supply of the comparator CMP2 is the voltage VOUT and the low-potential-side power supply of the comparator CMP2 is the system ground power supply voltage VSS, the threshold voltage VTH may be expressed by the following equation.

$$VTH = VOUT - Vthp - \alpha \quad (1)$$

Vthp is the threshold voltage of the P-type MOS transistor TRO which forms the voltage limiter circuit 150, and α is a positive constant of about 0.1 to 0.2 V. The output signal from the comparator CMP2 corresponds to the H level or the L level of the comparison result pulse shown in FIG. 22 (i.e., signal for monitoring the period of time in which a charge is discharged to the power supply line).

The level shifter 180 shifts the voltage level of the output signal from the comparator CMP2 to a given voltage level. The counter 182 counts the pulse width or the number of pulses of a pulse signal which is the output signal from the level shifter 180. The count value of the counter 182 within a predetermined period may be considered to be a signal which indicates the limiter operation information. Specifically, when the boost capability is high, the period in which the limiter circuit 53 operates increases. Therefore, the limiter operation information relating to the limiter circuit 53 can be converted into a numerical value by counting the pulse width or the number of pulses of the pulse signal. When counting the number of pulses of the pulse signal, the number of pulses corresponding to the period in which the limiter circuit 53 has operated within a predetermined period (one or more horizontal scan periods or one or more vertical scan periods) may be counted using a given clock signal such as a dot clock signal (pixel clock signal).

The determination logic section 184 compares the sum total data GSUM with a given threshold value to control the switch control section 110 of the voltage booster circuit 52. In this embodiment, the switch control section 110 enables at least one of the first and second charge-pump circuits $100_1$ and $100_2$ based on the determination result from the determination logic section 184. As a result, after the switch control section 110 has changed the boost capability of the voltage booster circuit 52, the power supply circuit 50 outputs the boosted voltage generated by the first charge-pump circuit $100_1$, the boosted voltage generated by the second charge-pump circuit $100_2$, or the boosted voltage generated by the first and second charge-pump circuits $100_1$ and $100_2$.

The determination logic section 184 determines whether or not to update the threshold value based on the count value of the counter 182. For example, the determination logic section 184 compares a given update determination threshold value with the count value. When the determination logic section 184 has determined that it is necessary to update the threshold value, the threshold value update section 186 increments or decrements the present threshold value to update the threshold value, and supplies the threshold value to the determination logic section 184. The determination logic section 184 compares the threshold value with the sum total data GSUM to control the switch control section 110. The threshold value is updated based on the comparison result between the given threshold voltage and the voltage VOUT (boosted voltage) by determining the operation period of the limiter circuit 53 based on the count value.

FIG. 23 is a view illustrative of an example of the operation of the determination logic section 184 shown in FIG. 20.

In the second configuration example, the boost capability of the voltage booster circuit 52 is changed corresponding to the sum total data GSUM for the calculation target scan line with respect to the maximum value of the sum total data GSUM. The determination logic section 184 has two threshold values THA and THB. The threshold value THA is a threshold value for determining whether or not to enable the first charge-pump circuit $100_1$ in a state in which the second charge-pump circuit $100_2$ is enabled. The threshold value THB is a threshold value for determining whether to enable either the first charge-pump circuit $100_1$ or the second charge-pump circuit $100_2$.

Therefore, when the sum total data GSUM is larger than the threshold value THA, the first and second charge-pump circuits $100_1$ and $100_2$ are enabled. When the sum total data GSUM is equal to or less than the threshold value THA and is larger than the threshold value THB, the first charge-pump circuit $100_1$ is disabled, and the second charge-pump circuit $100_2$ is enabled. When the sum total data GSUM is equal to or less than the threshold value THB, the first charge-pump circuit $100_1$ is enabled, and the second charge-pump circuit $100_2$ is disabled.

Figure 24:
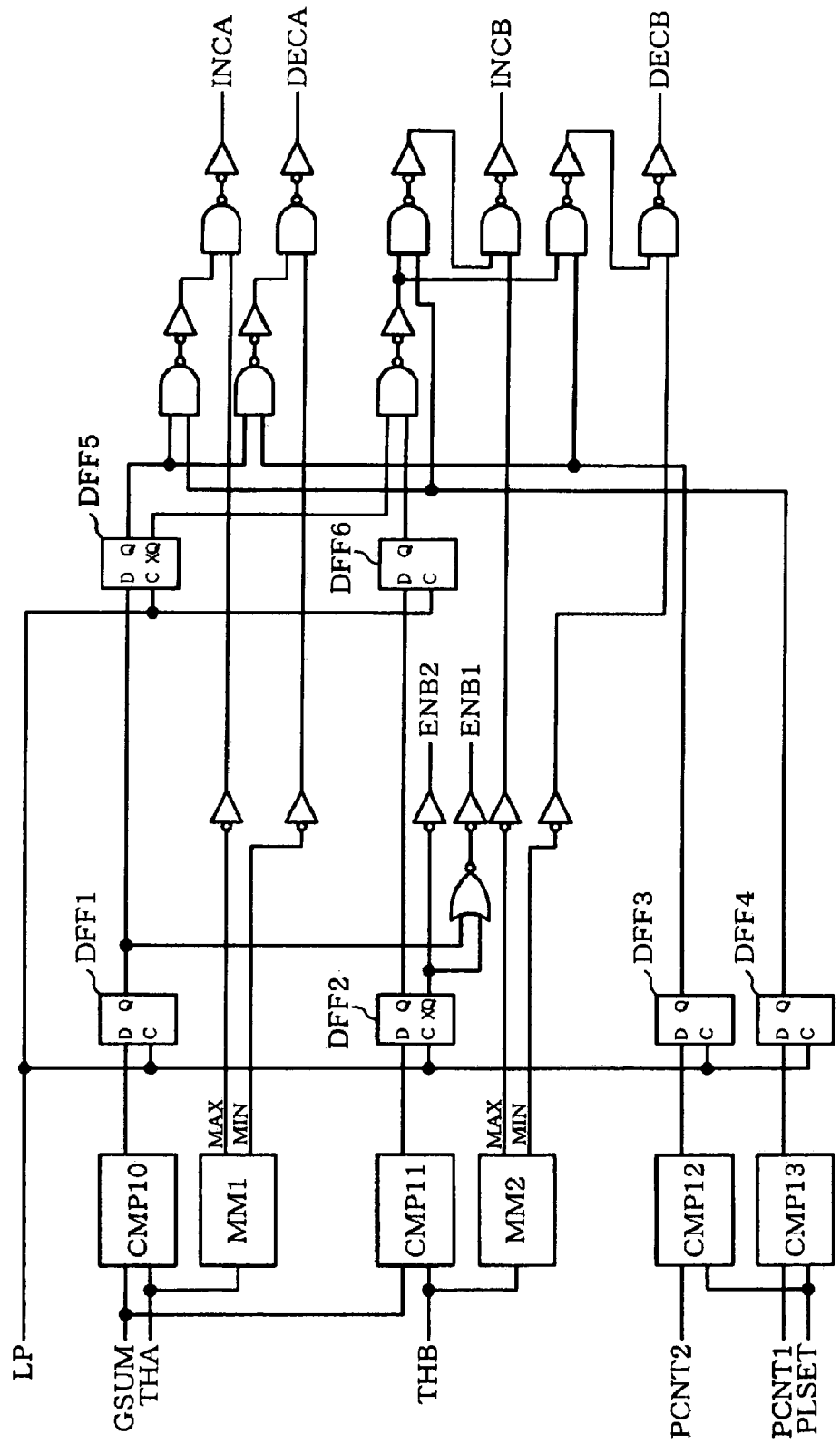
FIG. 24 is a circuit diagram showing the main portion of a configuration example of the determination logic section shown in FIG. 20.

FIG. 24 is a circuit diagram showing the main portion of a configuration example of the determination logic section 184 shown in FIG. 20.

The determination logic section 184 includes comparators CMP10, CMP11, CMP12, and CMP13, and minimum value/maximum value determination sections MM1 and MM2. The determination logic section 184 includes a plurality of flip-flops DFF1 to DFF6. Each flip-flop is initialized based on an initialization signal (not shown).

The horizontal synchronization signal LP, the sum total data GSUM, the threshold values THA and THB, and pulse data PLSET, PCNT1, and PCNT2 are input to the determination logic section 184 shown in FIG. 24. The determination logic section 184 outputs the control signals ENB1, ENB2, INCA, DECA, INCB, and DECB.

The pulse data PLSET is threshold value data. For example, the comparator CMP12 may output a comparison result signal which indicates that the voltage VOUT has become equal to or lower than a given threshold voltage (VTH=5.9 V) or a comparison result signal which indicates that the voltage VOUT has become equal to or higher than a given threshold voltage (VTH=6.12 V) based on the comparison result pulse. A result obtained by measuring the width (width in which a given level is maintained) or the pulse width of the comparison result signal which indicates that the voltage VOUT has become equal to or lower than a given threshold voltage (VTH=5.9 V) or the period in which the comparison result signal maintains a given level using a given clock signal (e.g., dot clock signal or pixel clock signal) is input to the determination logic section 184 as the pulse data PCNT1. A result obtained by measuring the width (width in which a given level is maintained) or the pulse width of the comparison result signal which indicates that the voltage VOUT has become equal to or higher than a given threshold voltage (VTH=6.12 V) or the period in which the comparison result signal maintains a given level using a given clock signal (e.g., dot clock signal or pixel clock signal) is input to the determination logic section 184 as the pulse data PCNT2. The determination logic section 184 compares the pulse data PLSET with the pulse data PCNT1 and PCNT2, respectively.

The limiter circuit 53 operates when the boost capability is too high. Therefore, when the determination logic section 184 has determined that the pulse data PCNT1 is larger than the pulse data PLSET, the determination logic section 184 increments the threshold value THB corresponding to the threshold voltage (VTH=5.9 V). Likewise, when the determination logic section 184 has determined that the pulse data PCNT2 is larger than the pulse data PLSET, the determination logic section 184 increments the threshold value THA corresponding to the threshold voltage (VTH=6.12 V).

The limiter circuit 53 does not operate when the boost capability is too low. Therefore, when the determination logic section 184 has determined that the pulse data PCNT 1 is smaller than the pulse data PLSET, the determination logic section 184 decrements the threshold value THB corresponding to the threshold voltage (VTH=5.9V). Likewise, when the determination logic section 184 has determined that the pulse data PCNT2 is smaller than the pulse data PLSET, the determination logic section 184 decrements the threshold value THA corresponding to the threshold voltage (VTH=6.12 V).

The control signal INCA is a control signal for incrementing the threshold value THA. The control signal INCB is a control signal for incrementing the threshold value THB. The control signal DECA is a control signal for decrementing the threshold value THA. The control signal DECB is a control signal for decrementing the threshold value THB.

The control signal ENB1 is a control signal for enabling the first charge-pump circuit $100_1$. The control signal ENB2 is a control signal for enabling the second charge-pump circuit $100_2$.

In FIG. 24, when the sum total data GSUM is larger than the threshold value THA, the output signal from the comparator CMP10 is set at the H level. When the sum total data GSUM is larger than the threshold value THB, the output signal from the comparator CMP11 is set at the H level. When the pulse data PCNT2 is larger than the pulse data PLSET, the output signal from the comparator CMP12 is set at the H level. When the pulse data PCNT1 is larger than the pulse data PLSET, the output signal from the comparator CMP13 is set at the H level.

The minimum value/maximum value determination section MM1 outputs a control signal which prohibits increment control when each bit of the threshold value THA is "1". The minimum value/maximum value determination section MM1 outputs a control signal which prohibits decrement control when each bit of the threshold value THA is "0".

The minimum value/maximum value determination section MM2 outputs a control signal which prohibits increment control when each bit of the threshold value THB is "1". The minimum value/maximum value determination section MM2 outputs a control signal which prohibits decrement control when each bit of the threshold value THB is "0".

As described above, the determination logic section 184 can enable the first and second charge-pump circuits $100_1$ and $100_2$ based on the sum total data GSUM and the threshold values THA and THB. The determination logic section 184 can determine the period in which the limiter circuit 53 has operated based on the comparison result pulse, and increment or decrement the threshold values THA and THB according to the determination result.

According to this embodiment, since a charge is discharged to the power supply line to which the boost target power supply is supplied even when the boosted voltage has exceeded the target voltage, power consumption can be reduced to a large extent as compared with the case of discharging a charge to the power supply line to which the system ground power supply voltage VSS is supplied. According to the first configuration example, the boosted voltage can be generated with a high boost capability when the output load of the power supply circuit 50 is high, and can be generated with a low boost capability when the output load of the power supply circuit 50 is low, whereby the boosted voltage can be stably supplied without decreasing the boost efficiency to a large extent. According to the second configuration example, since the boost capability of the voltage booster circuit can be changed corresponding to the output load, a situation in which the boost efficiency decreases with respect to the output load can be prevented while preventing a decrease in boost capability when the output load of the power supply circuit 50 is high.

2.3 Modification

Figure 25:
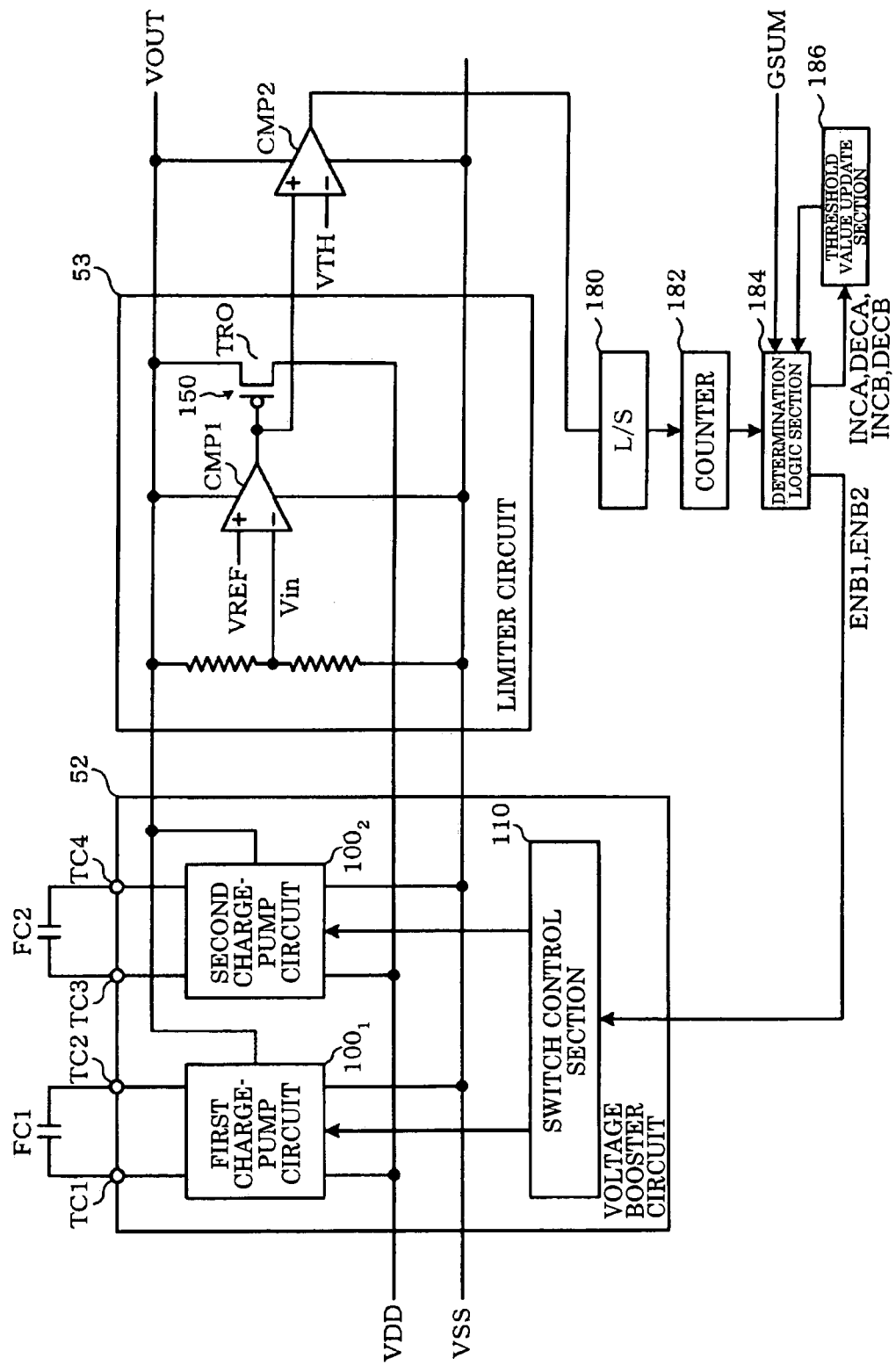
FIG. 25 is a view showing a configuration example of a voltage booster circuit and a limiter circuit of a power supply circuit according to a modification.

A modification of this embodiment is described below. FIG. 25 shows a configuration example of the voltage booster circuit 52 and the limiter circuit 53 of the power supply circuit 50 according to a modification of this embodiment. The regulator REG1 is provided in the second configuration example shown in FIG. 20. The regulator REG1 is not provided in the modification shown in FIG. 25.

The voltage booster circuit 52 includes a plurality of charge-pump circuits which differ in boost capability. The boost capability of the voltage booster circuit 52 can be changed by enabling/disabling the operations of the charge-pump circuits.

As shown in FIG. 25, the voltage booster circuit 52 includes the first and second charge-pump circuits $100_1$ and $100_2$ and the switch control section 110, for example. The first flying capacitor FC1 used for the charge-pump operation of the first charge-pump circuit $100_1$ is connected to the external connection terminals TC1 and TC2 of the voltage booster circuit 52. The second flying capacitor FC2 used for the charge-pump operation of the second charge-pump circuit $100_2$ is connected to the external connection terminals TC3 and TC4 of the voltage booster circuit 52. The relationship between the capacitance of the first flying capacitor FC1 and the capacitance of the second flying capacitor FC2 and the relationship between the current supply capability of the transistor which forms the first charge-pump circuit $100_1$ and the current supply capability of the transistor which forms the second charge-pump circuit $100_2$ are the same as in FIGS. 20 and 21.

The second charge-pump circuit $100_2$ which has been enabled generates the power supply voltage VOUT by boosting the voltage between the system ground power supply voltage VSS and the system power supply voltage VDD with respect to the system ground power supply voltage VSS by a factor of two, for example.

The switch control section 110 enables/disables the first and second charge-pump circuits $100_1$ and $100_2$. Specifically, the switch control section 110 enables one of the first and second charge-pump circuits $100_1$ and $100_2$, or enables both of the first and second charge-pump circuits $100_1$ and $100_2$. This enables the switch control section 110 to select the boost capability of the voltage booster circuit 52 from three states.

Figure 26:
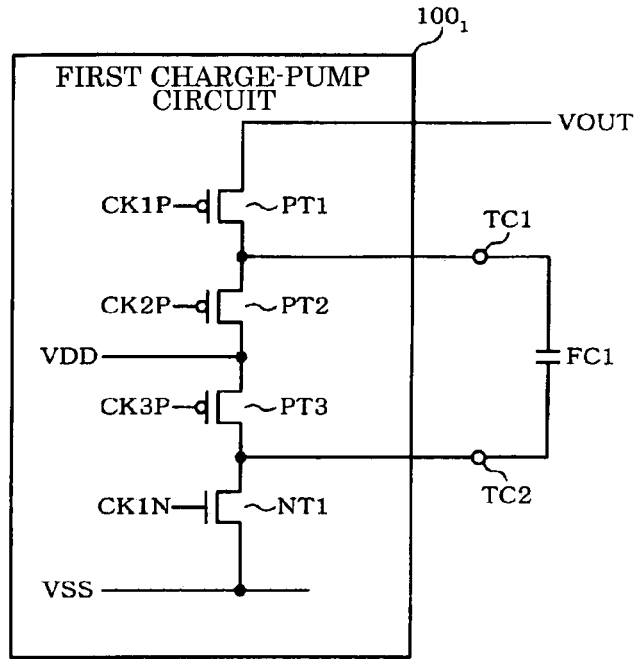
FIG. 26 is a circuit diagram showing a configuration example of a first charge-pump circuit shown in FIG. 25.

FIG. 26 is a circuit diagram showing a configuration example of the first charge-pump circuit $100_1$ shown in FIG. 25. The configuration shown in FIG. 26 is the same as the configuration shown in FIG. 13 except that the system power supply voltage VDD is used instead of the voltage VREG Note that the second charge-pump circuit $100_2$ has the same configuration as that of the first charge-pump circuit $100_1$ shown in FIG. 26.

The first charge-pump circuit $100_1$ includes transistors (switching elements) for generating the boosted voltage using a charge stored in the first flying capacitor FC1 by a charge-pump operation. Specifically, the first charge-pump circuit $100_1$ includes the P-type MOS transistors PT1 and PT2 inserted in series between the output power supply line to which the boosted voltage is output and the power supply line to which the system power supply voltage VDD is supplied. The first charge-pump circuit $100_1$ also includes the P-type MOS transistor PT3 and the N-type MOS transistor NT1 inserted in series between the power supply line to which the system power supply voltage VDD is supplied and the power supply line to which the system ground power supply voltage VSS is supplied.

In the period PH1 shown in FIG. 14, the transistor PT1 is turned ON and the transistor PT2 is turned OFF, whereby the voltage at one end of the first flying capacitor FC1 connected to the first charge-pump circuit $100_1$ through the terminal TC1 is output to the output power supply line. In this case, the transistor PT3 is turned ON and the transistor NT1 is turned OFF, whereby the system power supply voltage VDD is supplied to the other end of the first flying capacitor FC1 connected to the first charge-pump circuit $100_1$ through the external connection terminal TC2.

In the period PH2, the transistor PT1 is turned OFF and the transistor PT2 is turned ON, whereby the system power supply voltage VDD is supplied to one end of the first flying capacitor FC1 connected to the first charge-pump circuit $100_1$ through the terminal TC1. In this case, the transistor PT3 is turned OFF and the transistor NT1 is turned ON, whereby the system ground power supply voltage VSS is supplied to the other end of the first flying capacitor FC1 connected to the first charge-pump circuit $100_1$ through the external connection terminal TC2. Therefore, a charge corresponding to the voltage between the system power supply voltage VDD and the system ground power supply voltage VSS is stored in the first flying capacitor FC1 in the period PH2.

In the period PH1, the voltage at one end of the first flying capacitor FC1 is again output to the output power supply line.

In this case, since the other end of the first flying capacitor FC1 connected to the external connection terminal TC2 is set at the system power supply voltage VDD, the output power supply line is set at a voltage twice the voltage between the system power supply voltage VDD and the system ground power supply voltage VSS.

Again referring to FIG. 25, the limiter circuit 53 shown in FIG. 25 includes the comparator CMP1 and the voltage limiter circuit 150.

The input voltage Vin obtained by dividing the voltage between the voltage VOUT and the system ground power supply voltage VSS using resistors and a given reference voltage VREF are input to the comparator CMP1. The comparator CMP1 outputs a comparison result between the input voltage Vin and the reference voltage VREF as a comparison result pulse.

The voltage limiter circuit 150 includes the P-type MOS transistor TR0. The comparison result pulse from the comparator CMP1 is input to the gate of the P-type MOS transistor TR0. A power supply line to which the voltage VOUT is supplied is connected to the source of the P-type MOS transistor TR0. A power supply line to which the system power supply voltage VDD is supplied is connected to the drain of the P-type MOS transistor TR0.

Figure 27:
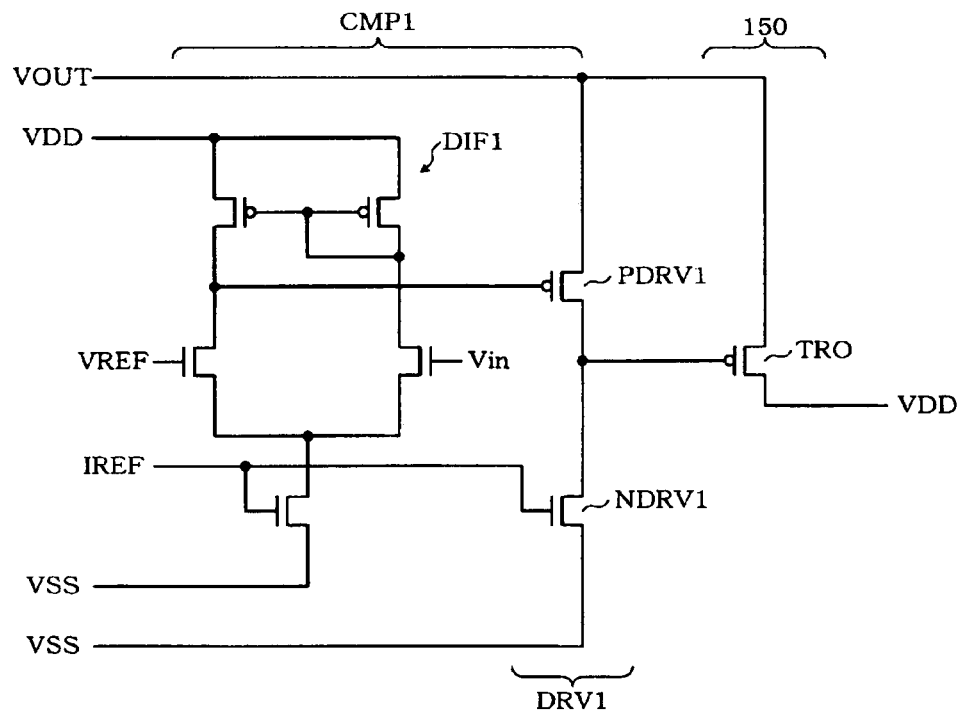
FIG. 27 is a circuit diagram showing a configuration example of a comparator and a voltage limiter circuit shown in FIG. 25.

FIG. 27 is a circuit diagram showing a configuration example of the comparator CMP1 and the voltage limiter circuit 150 shown in FIG. 25. In FIG. 27, the transistor shown in FIG. 15 to which the control signal LMTen is input at the gate is not provided.

In FIG. 27, when the input voltage Vin is higher in potential than the reference voltage VREF, the potential of the output voltage from the differential amplifier DIF1 increases so that the impedance of the P-type MOS transistor PDRV1 increases. As a result, the potential of the comparison result pulse which is the output from the comparator CMP1 decreases. In this case, the impedance of the P-type MOS transistor TR0 decreases so that the amount of charge discharged to the power supply line to which the system power supply voltage VDD is supplied increases.

When the input voltage Vin is lower in potential than the reference voltage VREF, the potential of the output voltage from the differential amplifier DIF1 decreases so that the impedance of the P-type MOS transistor PDRV1 decreases. As a result, the potential of the comparison result pulse which is the output from the comparator CMP1 increases. In this case, the impedance of the P-type MOS transistor TR0 increases so that the amount of charge discharged to the power supply line to which the system power supply voltage VDD is supplied decreases.

According to the modification of this embodiment, the boost capability of the voltage booster circuit 52 can be changed corresponding to the output load of the power supply circuit 50. Therefore, the power supply circuit 50 can compare the sum total data GSUM (i.e., evaluation value for evaluating the output load) with a given threshold value to determine whether or not to change the boost capability. Specifically, the power supply circuit 50 decreases the boost capability when the power supply circuit 50 has determined that the boost capability is high with respect to the output load of the power supply circuit 50, and increases the boost capability when the power supply circuit 50 has determined that the boost capability is low with respect to the output load of the power supply circuit 50.

The threshold value is updated based on the limiter operation information which indicates whether or not the limiter circuit 53 has limited the potential of the voltage VOUT (i.e., boosted voltage). Therefore, the power supply circuit 50 can change the boost capability of the voltage booster circuit 52 based on the output load of the power supply circuit 50 and the limiter operation information.

The power supply circuit 50 may further include the comparator CMP2, the level shifter 180, the counter 182, the determination logic section 184, and the threshold value update section 186, as shown in FIG. 25. The configurations and the operations of the comparator CMP2, the level shifter 180, the counter 182, the determination logic section 184, and the threshold value update section 186 are the same as in FIG. 20.

According to the modification of this embodiment, since a charge is discharged to the power supply line to which the system power supply voltage VDD (i.e., boost target power supply) is supplied when the boosted voltage has exceeded the target voltage, power consumption can be reduced to a large extent as compared with the case of discharging a charge to the power supply line to which the system ground power supply voltage VSS is supplied. Moreover, since the boost capability of the voltage booster circuit can be changed corresponding to the output load, a situation in which the boost efficiency decreases with respect to the output load can be prevented while preventing a decrease in boost capability decreases when the output load is high.

3. Electronic Instrument

Figure 28:
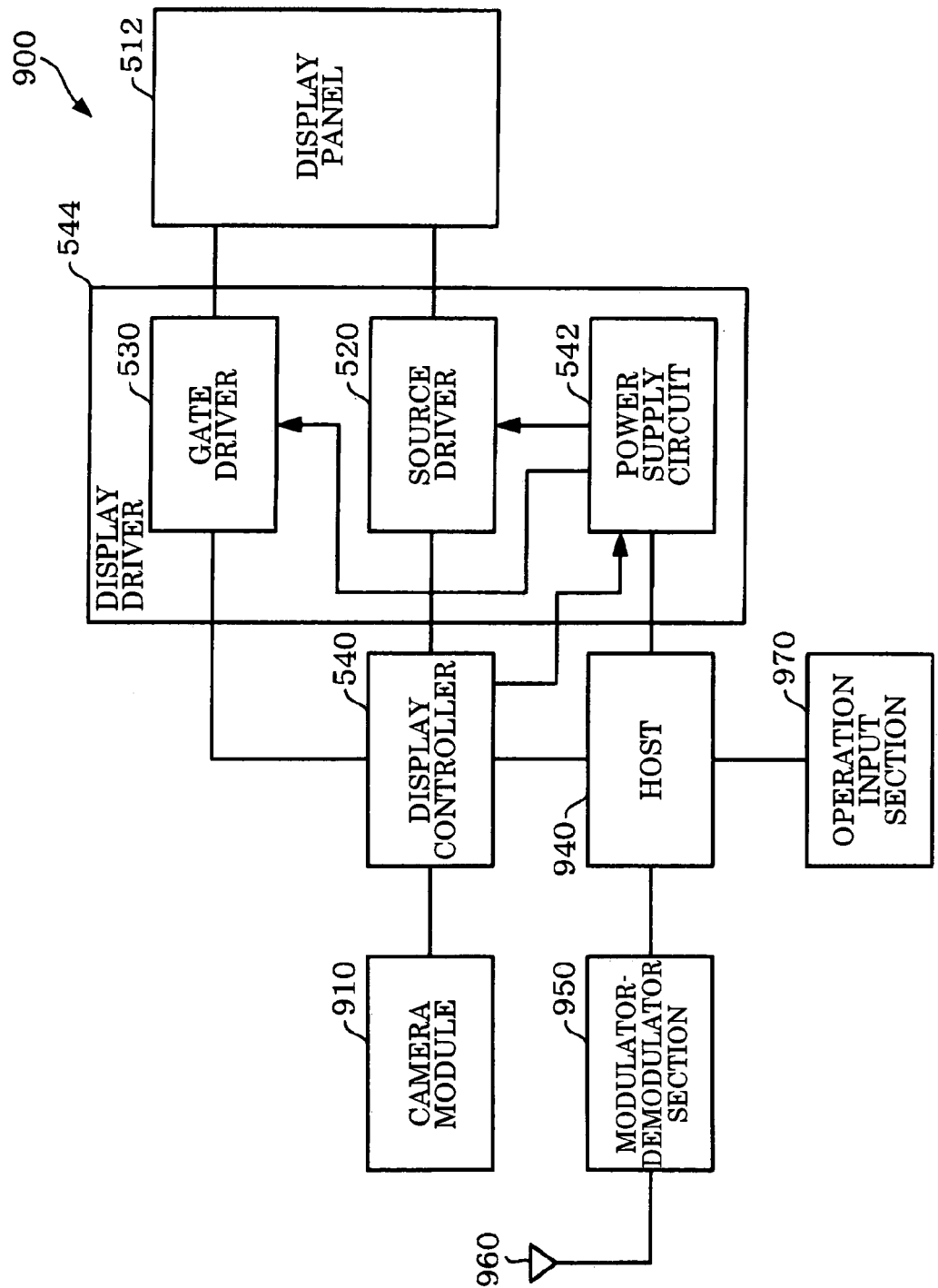
FIG. 28 is a block diagram showing a configuration example of an electronic instrument to which a power supply circuit according to one embodiment of the invention is applied.

FIG. 28 is a block diagram showing a configuration example of an electronic instrument to which a power supply circuit according to one embodiment of the invention is applied. FIG. 28 is a block diagram showing a configuration example of a portable telephone as an example of the electronic instrument.

A portable telephone 900 includes a camera module 910. The camera module 910 includes a CCD camera, and supplies image data obtained by the CCD camera to a display controller 540 in a YUV format. The display controller 540 has a function of the display controller 40 shown in FIG. 1 or 2.

The portable telephone 900 includes a display panel 512. The display panel 512 is driven by a source driver 520 and a gate driver 530. The display panel 512 includes a plurality of gate lines, a plurality of source lines, and a plurality of pixels. The display panel 512 has a function of the display panel 12 shown in FIG. 1 or 2.

The display controller 540 is connected to the source driver 520 and the gate driver 530, and supplies grayscale data in an RGB format to the source driver 520.

A power supply circuit 542 is connected to the source driver 520 and the gate driver 530, and supplies drive power supply voltages to the source driver 520 and the gate driver 530. The power supply circuit 542 has a function of the power supply circuit 50 shown in FIG. 1 or 2. The portable telephone 900 includes the source driver 520, the gate driver 530, and the power supply circuit 542 as a display driver 544. The display driver 544 drives the display panel 512.

A host 940 is connected to the display controller 540. The host 940 controls the display controller 540. The host 940 demodulates grayscale data received via an antenna 960 using a modulator-demodulator section 950, and supplies the demodulated grayscale data to the display controller 540. The display controller 540 causes the source driver 520 and the gate driver 530 to display an image on the display panel 512 based on the grayscale data. The source driver 520 has a function of the source driver according to any of the first to third embodiments. The gate driver 530 has a function of the gate driver 30 shown in FIG. 1 or 2.

The host 940 modulates grayscale data generated by the camera module 910 using the modulator-demodulator section 950, and instructs transmission of the modulated data to another communication device via the antenna 960.

The host 940 transmits/receives grayscale data, captures an image using the camera module 910, or displays an image on the display panel 512 based on operation information from an operation input section 970.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention. For example, the invention may be applied not only to drive the above liquid crystal display panel, but also to drive an electroluminescent display device, a plasma display device, and the like. The invention may also be applied to supply power to various circuits instead of driving a display panel.

The liquid crystal display device according to the above embodiment may be incorporated in various electronic instruments such as a portable telephone, a portable information instrument (e.g., PDA), a digital camera, a projector, a portable audio player, a mass storage device, a video camera, an electronic notebook, or a global positioning system (GPS).

Some of the requirements of any claim of the invention may be omitted from a dependent claim which depends on that claim. Some of the requirements of any independent claim of the invention may be allowed to depend on any other independent claim.

What is claimed is:

1. A power supply circuit that outputs a boosted voltage, the power supply circuit comprising:
    a voltage booster circuit that generates a boosted voltage by boosting a second voltage with respect to a first voltage; and
    a limiter circuit that limits a potential of the boosted voltage,
    the limiter circuit discharging a charge to or charging a charge from a power supply line so that the boosted voltage becomes a given target voltage, the second voltage being supplied to the power supply line,
    the power supply circuit further including a regulator that regulates a potential of a given input voltage,
    a drive voltage of an electro-optical device being generated based on the boosted voltage,
    the power supply circuit outputting a voltage obtained by limiting the potential of the boosted voltage using the limiter circuit as the boosted voltage when the electro-optical device is driven in a high-load display mode, and
    the power supply circuit outputting a voltage obtained by boosting an output voltage from the regulator using the voltage booster circuit as the boosted voltage without limiting the potential of the boosted voltage using the limiter circuit when the electro-optical device is driven in a low-load display mode.

2. The power supply circuit as defined in claim 1,
    the power supply circuit further including a display mode setting register,
    the power supply circuit outputting a voltage obtained by limiting the potential of the boosted voltage using the limiter circuit as the boosted voltage when the high-load display mode is designated by control data set in the display mode setting register,
    the power supply circuit outputting a voltage obtained by boosting the output voltage from the regulator using the voltage booster circuit as the boosted voltage when the low-load display mode is designated by the control data set in the display mode setting register.

3. The power supply circuit as defined in claim 1,
    the voltage booster circuit including:
    a first charge-pump circuit that generates the boosted voltage by boosting the output voltage from the regulator with respect to the first voltage by a charge-pump operation using a first flying capacitor; and
    a second charge-pump circuit that generates the boosted voltage by boosting the second voltage with respect to the first voltage by a charge-pump operation using a second flying capacitor, the second flying capacitor having a capacitance larger than a capacitance of the first flying capacitors,
    the power supply circuit outputting the boosted voltage generated by the first charge-pump circuit and the second charge-pump circuit or the boosted voltage generated by the second charge-pump circuit when the electro-optical device is driven in the high-load display mode,
    the power supply circuit outputting the boosted voltage generated by the first charge-pump circuit when the electro-optical device is driven in the low-load display mode.

4. The power supply circuit as defined in claim 1,
    the power supply circuit performing control that changes a boost capability of the voltage booster circuit corresponding to an output load of the power supply circuit when the electro-optical device is driven in the high-load display mode,
    the power supply circuit omitting the control that changes the boost capability of the voltage booster circuit corresponding to the output load of the power supply circuit when the electro-optical device is driven in the low-load display mode.

5. The power supply circuit as defined in claim 4,
    when the high-load display mode is designated, the power supply circuit decreasing the boost capability when the power supply circuit has determined that the boost capability is high with respect to the output load of the power supply circuit, and increasing the boost capability when the power supply circuit has determined that the boost capability is low with respect to the output load of the power supply circuit.

6. The power supply circuit as defined in claim 4,
    when the high-load display mode is designated, the voltage booster circuit changing the boost capability based on the output load of the power supply circuit and limiter operation information, the limiter operation information indicating whether or not the limiter circuit has limited the potential of the boosted voltage.

7. The power supply circuit as defined in claim 4,
    when the high-load display mode is designated, the voltage booster circuit changing the boost capability based on a comparison result between a threshold value and the output load of the power supply circuit, the threshold value being updated based on the limiter operation information.

8. The power supply circuit as defined in claim 4,
    a drive voltage corresponding to grayscale data supplied to a source line among a plurality of source lines of the electro-optical device being generated based on the boosted voltage,
    the output load being evaluated based on a sum total of grayscale data of the plurality of source lines corresponding to one scan line.

9. A power supply circuit that outputs a boosted voltage, the power supply circuit comprising:
    a voltage booster circuit that generates a boosted voltage by boosting a second voltage with respect to a first voltage; and
    a limiter circuit that limits a potential of the boosted voltage,
    the limiter circuit discharging a charge to or charging a charge from a power supply line so that the boosted voltage becomes a given target voltage, the second voltage being supplied to the power supply line,
    the voltage booster circuit changing a boost capability corresponding to an output load of the power supply circuit, the power supply circuit decreasing the boost capability when the power supply circuit has determined that the boost capability is high with respect to the output load of the power supply circuit, and the power supply circuit increasing the boost capability when the power supply circuit has determined that the boost capability is low with respect to the output load of the power supply circuit.

10. A power supply circuit that outputs a boosted voltage, the power supply circuit comprising:

a voltage booster circuit that generates a boosted voltage by boosting a second voltage with respect to a first voltage; and a limiter circuit that limits a potential of the boosted voltage, the limiter circuit discharging a charge to or charging a charge from a power supply line so that the boosted voltage becomes a given target voltage, the second voltage being supplied to the power supply line, the voltage booster circuit changing a boost capability corresponding to an output load of the power supply circuit, and the voltage booster circuit changing the boost capability based on the output load and limiter operation information, the limiter operation information indicating whether or not the limiter circuit has limited the potential of the boosted voltage.

11. The power supply circuit as defined in claim 9, the voltage booster circuit changing the boost capability based on a comparison result between a threshold value and the output load, the threshold value being updated based on the limiter operation information.

12. The power supply circuit as defined in claim 11, the threshold value being updated based on a comparison result between a given threshold voltage and the boosted voltage.

13. The power supply circuit as defined in claim 12, the power supply circuit further including:

a comparator that compares the given threshold voltage with the boosted voltage; and a counter that counts a pulse width or a number of pulses of an output result of the comparator, the threshold value being updated based on a count value of the counter.

14. A power supply circuit that outputs a boosted voltage, the power supply circuit comprising:

a voltage booster circuit that generates a boosted voltage by boosting a second voltage with respect to a first voltage; and a limiter circuit that limits a potential of the boosted voltage, the limiter circuit discharging a charge to or charging a charge from a power supply line so that the boosted voltage becomes a given target voltage, the second voltage being supplied to the power supply line, the voltage booster circuit changing a boost capability corresponding to an output load of the power supply circuit, a drive voltage corresponding to grayscale data supplied to a source line among a plurality of source lines of the electro-optical device being generated based on the boosted voltage, the output load being evaluated based on a sum total of grayscale data of the plurality of source lines corresponding to one scan line.

15. A power supply circuit that outputs a boosted voltage, the power supply circuit comprising:

a voltage booster circuit that generates a boosted voltage by boosting a second voltage with respect to a first voltage; and a limiter circuit that limits a potential of the boosted voltage, the limiter circuit discharging a charge to or charging a charge from a power supply line so that the boosted voltage becomes a given target voltage, the second voltage being supplied to the power supply line, the voltage booster circuit changing a boost capability corresponding to an output load of the power supply circuit, the voltage booster circuit including:

a first charge-pump circuit that generates the boosted voltage by boosting the output voltage from the regulator with respect to the first voltage by a charge-pump operation using a first flying capacitor; and a second charge-pump circuit that generates the boosted voltage by boosting the second voltage with respect to the first voltage by a charge-pump operation using a second flying capacitor, the second flying capacitor having a capacitance larger than a capacitance of the first flying capacitors, the power supply circuit outputting the boosted voltage generated by the first charge-pump circuit, the boosted voltage generated by the second charge-pump circuit, or the boosted voltage generated by the first charge-pump circuit and the second charge-pump circuit after the boost capability of the voltage booster circuit has been changed.

16. A display driver that drives an electro-optical device, the display driver comprising:

a power supply circuit that outputs a boosted voltage, the power supply circuit including:

a voltage booster circuit that generates a boosted voltage by boosting a second voltage with respect to a first voltage; and a limiter circuit that limits a potential of the boosted voltage, the limiter circuit discharging a charge to or charging a charge from a power supply line so that the boosted voltage becomes a given target voltage, the second voltage being supplied to the power supply line, a driver section that drives the electro-optical device, and a drive voltage of the driver section being generated based on the boosted voltage.

17. An electro-optical device comprising:

a plurality of gate lines;

a plurality of source lines;

a gate driver that scans the plurality of gate lines;

a source driver that drives the plurality of source lines;

a power supply circuit, the power supply circuit including:

a voltage booster circuit that generates a boosted voltage by boosting a second voltage with respect to a first voltage; and a limiter circuit that limits a potential of the boosted voltage, the limiter circuit discharging a charge to or charging a charge from a power supply line so that the boosted voltage becomes a given target voltage, the second voltage being supplied to the power supply line; and at least one of a scan voltage of the gate driver and a drive voltage of the source driver being generated based on the boosted voltage.

18. An electronic instrument comprising the power supply circuit as defined in claim 1.

* * * * *